(12) United States Patent
Cheng et al.

(10) Patent No.: US 12,284,125 B2
(45) Date of Patent: *Apr. 22, 2025

(54) SYSTEM AND METHOD FOR COMMUNICATING TIME AND FREQUENCY TRACKING SIGNALS USING CONFIGURATIONS FOR ONE PORT CSI-RSs

(71) Applicant: Futurewei Technologies, Inc., Addison, TX (US)

(72) Inventors: Qian Cheng, Naperville, IL (US); Weimin Xiao, Hoffman Estates, IL (US); Jialing Liu, Palatine, IL (US); Murali Narasimha, Lake Oswego, OR (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/330,813

(22) Filed: Jun. 7, 2023

(65) Prior Publication Data
US 2023/0396376 A1 Dec. 7, 2023

Related U.S. Application Data

(63) Continuation of application No. 17/242,010, filed on Apr. 27, 2021, now Pat. No. 11,711,180, which is a (Continued)

(51) Int. Cl.
*H04L 5/00* (2006.01)
*H04L 27/26* (2006.01)

(52) U.S. Cl.
CPC .......... *H04L 5/0023* (2013.01); *H04L 5/0007* (2013.01); *H04L 5/0048* (2013.01);
(Continued)

(58) Field of Classification Search
None
See application file for complete search history.

(56) References Cited

U.S. PATENT DOCUMENTS 9,107,213 B2 8/2015 Ng et al.
2014/0092827 A1 4/2014 Jöngren et al.
(Continued)

FOREIGN PATENT DOCUMENTS

CN 103945447 A 7/2014
CN 104065466 A 9/2014
(Continued)

OTHER PUBLICATIONS

"3rd Generation Partnership Project; Technical Specification Group Radio Access Network; Study on New Radio (NR) Access Technology; Physical Layer Aspects (Release 14)," 3GPP TR 38.802 V2.0.0 (Mar. 2017).
(Continued)

*Primary Examiner* — Walter J Divito
(74) *Attorney, Agent, or Firm* — Slater Matsil, LLP

(57) ABSTRACT

A network controller may configure one or more channel state information-reference signal (CSI-RS) configurations for transmitting RSs to user equipments (UEs) for tracking. A CSI-RS configuration may specify a set of CSI-RS resources for transmitting RSs in two consecutive slots. The set of CSI-RS resources may include a plurality of one-port CSI-RS resources configured according to the CSI-RS configuration. The CSI-RS configuration may specify a quasi co-location (QCL) configuration including a set of QCL parameters, where a demodulation reference signal (DMRS) has a QCL relationship with the RS with respect to the set of QCL parameters. The network controller may signal the one or more CSI-RS configurations to UEs.

24 Claims, 10 Drawing Sheets

Related U.S. Application Data continuation of application No. 16/994,339, filed on Aug. 14, 2020, now Pat. No. 10,992,442, which is a continuation of application No. 16/101,278, filed on Aug. 10, 2018, now Pat. No. 10,790,956.

(60) Provisional application No. 62/544,372, filed on Aug. 11, 2017.

(52) U.S. Cl.
CPC .......... *H04L 5/0051* (2013.01); *H04L 5/0057* (2013.01); *H04L 27/2613* (2013.01)

(56) References Cited

U.S. PATENT DOCUMENTS

| | | | |
|---|---|---|---|
| 2014/0126490 | A1 | 5/2014 | Chen et al. |
| 2015/0029966 | A1 | 1/2015 | Park et al. |
| 2015/0078272 | A1 | 3/2015 | Kim et al. |
| 2018/0331860 | A1 | 11/2018 | Bergman et al. |
| 2019/0045488 | A1 | 2/2019 | Park et al. |
| 2019/0058517 | A1 | 2/2019 | Kang et al. |
| 2019/0159209 | A1 | 5/2019 | Xiao et al. |
| 2020/0067584 | A1 | 2/2020 | Jiwon et al. |
| 2020/0068416 | A1 | 2/2020 | Kang et al. |
| 2020/0162228 | A1 | 5/2020 | Gao et al. |

FOREIGN PATENT DOCUMENTS

| | | |
|---|---|---|
| CN | 104956611 A | 9/2015 |
| CN | 105144612 A | 12/2015 |
| CN | 2016033978 A1 | 3/2016 |
| EP | 3462664 A1 | 4/2019 |
| EP | 3462664 A4 | 2/2020 |
| JP | 2016511563 A | 4/2016 |
| JP | 2020519214 A | 6/2020 |
| WO | 2014129716 A1 | 8/2014 |
| WO | 2014157929 A2 | 10/2014 |
| WO | 2019017751 A1 | 1/2019 |

OTHER PUBLICATIONS

"3rd Generation Partnership Project; Technical Specification Group Radio Access Network; NR; Multiplexing and channel coding (Release 15)", 3GPP TS 38.212 V0.0.0, Technical Specification, May 2017, 10 Pages.

"3rd Generation Partnership Project; Technical Specification Group Radio Access Network; Study on New Radio Access Technology Physical Layer Aspects (Release 14)", 3GPP TR 38.802 V14.1.0, Technical Report,, Jun. 2017, 144 Pages.

"3rd Generation Partnership Project; Technical Specification Group Radio Access Network; NR; Physical channels and modulation (Release 15)", 3GPP TS 38.211 V0.1.0, Technical Specification, Jun. 2017, 22 Pages.

"3rd Generation Partnership Project; Technical Specification Group Radio Access Network; NR; Radio Resource Control (RRC); Protocol specification (Release 15)", 3GPP TS 38.331 V0.0.4, Technical Specification, Jun. 2017, 22 Pages.

"3rd Generation Partnership Project; Technical Specification Group Radio Access Network; NR; Medium Access Control (MAC) protocol specification (Release 15)", 3GPP TS 38.321 V0.2.0, Technical Specification, Aug. 2017, 36 Pages.

"3rd Generation Partnership Project; Technical Specification Group Radio Access Network; NR; NR and NG-RAN Overall Description; Stage 2 (Release 15)", 3GPP TS 38.300 V0.6.0, Technical Specification, Aug. 2017, 58 Pages.

RAN WG1, "Reply LS on CSI-RS Design for Beam Management", 3GPP TSG RAN WG1 Meeting #84, R4-1707028, Aug. 21-25, 2017, 4 Pages, Berlin, Germany.

"Details of QCL assumptions and related RS design considerations", R1-1701697 Huawei, HiSilicon, 3GPP TSG RAN WG1 Meeting #88, Athens, Feb. 13-17, 2017, 5 pages.

"Summary of [88b-12] email discussion on QCL types for NR", R1-1709812 ZTE, 3GPP TSG RAN WG1 Meeting #89, Hangzhou, P.R. China, May 15-19, 2017, 13 pages.

"Summary of QCL", R1-1711672 Nokia, 3GPP TSG RAN WG1 NR Ad-Hoc#2, Qingdao, P.R. China, Jun. 27-30, 2017, 11 pages.

Intel Corporation, "Corrections to QCL for NR", 3GPP TSG RAN WG1 Meeting AH 1801, R1-1800320, Jan. 22-26, 2018, 6 pages, Vancouver, Canada.

SYSTEM AND METHOD FOR COMMUNICATING TIME AND FREQUENCY TRACKING SIGNALS USING CONFIGURATIONS FOR ONE PORT CSI-RSs

CROSS-REFERENCE TO RELATED APPLICATIONS

This application is a continuation of U.S. patent application Ser. No. 17/242,010, filed on Apr. 27, 2021, now U.S. Pat. No. 11,711,180 issued on Jul. 25, 2023, and entitled "System and Method for Communicating Time and Frequency Tracking Signals using Configurations for One Port CSI-RSs," which is a continuation of U.S. patent application Ser. No. 16/994,339, filed on Aug. 14, 2020, now U.S. Pat. No. 10,992,442 issued on Apr. 27, 2021, and entitled "System and Method for Communicating Time and Frequency Tracking Signals using Configurations for One Port CSI-RSs," which is a continuation of U.S. patent application Ser. No. 16/101,278, filed on Aug. 10, 2018, now U.S. Pat. No. 10,790,956 issued on Sep. 29, 2020, and entitled "System and Method for Communicating Time and Frequency Tracking Signals using Configurations for One Port CSI-RSs", which claims the benefit of U.S. Provisional Application No. 62/544,372, filed on Aug. 11, 2017, entitled "System and method for time and frequency tracking signal with flexible configurations of one port CSI-RS". The afore-mentioned applications are hereby incorporated herein by reference in their entireties.

TECHNICAL FIELD

The present disclosure relates to wireless communications, and, in particular embodiments, to a system and method for communicating time and frequency tracking signals using configurations for one port CSI-RSs.

BACKGROUND

In wireless communications operations, tracking functionalities performed by a user equipment (UE) may include fine time tracking, fine frequency tracking, delay spread estimation and Doppler spread estimation.

In fine time tracking, a UE may detect the first arriving path, and based thereon, the UE may generally optimally place its Fast Fourier transform (FFT) window to maximize a data signal to noise plus inter-symbol interference ratio. In a continuous operation, a FFT window position may drift due to UE mobility and a residual oscillator error between a transmitter and a receiver. The UE may adjust its FFT window position based on a detected change of path arriving time.

In fine frequency tracking, a UE may detect a frequency offset between a transmitter and a receiver, and adjust its oscillator accordingly. A residual frequency error may be estimated and compensated in demodulation of data symbols. The residual frequency error compensation may be very critical, especially in the case of high signal-to-noise ratio (SNR) and high code rate data transmissions. Uncompensated frequency error may impose phase error on modulated data symbols and result in decoding performance degradation. Because temperature change affects output precision of an oscillator and Doppler shift caused by UE movement, a UE may periodically track the frequency offset and apply corresponding adjustment and compensation.

Delay spread determines how dispersive a wireless multipath channel that a UE experiences is. The longer the delay spread, the more frequency selective the channel is. To generally maximize processing gains along the frequency domain in channel estimation based on received pilot signals, the UE may apply linear filtering with a length as long as possible if within the coherent bandwidth of the channel. Coherent bandwidth is inversely proportion to channel selectiveness. Thus, delay spread estimation plays an important role in forming channel estimation filter coefficients and length, hence affecting the performance of channel estimation and data demodulation.

Doppler spread is usually proportional to UE movement speeds and multi-path spatial distribution. Larger Doppler spread corresponds to a faster changing wireless multi-path fading channel. Channel estimation usually applies filtering in the time domain with longer filter length to suppress noise plus interference if within the channel coherent time constraint. Doppler spread estimation is thus another factor along the time domain affecting UE channel estimation performance.

SUMMARY

Technical advantages are generally achieved, by embodiments of this disclosure which describe a system and method for communicating time and frequency tracking signals using configurations for one port CSI-RSs.

According to one aspect of the present disclosure, there is provided a method that includes: transmitting, by a network controller, a first reference signal (RS) for tracking according to a first channel state information-RS (CSI-RS) configuration, the first CSI-RS configuration specifying: a first set of CSI-RS resources in two consecutive slots for transmitting the first RS, the first set of CSI-RS resources comprising a plurality of one-port CSI-RS resources configured according to the first CSI-RS configuration; and a first quasi co-location (QCL) configuration comprising a first set of QCL parameters, the first QCL configuration indicating that the first RS has a QCL relationship with a first demodulation reference signal (DMRS) with respect to the first set of QCL parameters.

Optionally, in any of the preceding aspects, the first set of CSI-RS resources comprises four one-port CSI-RS resources, the four one-port CSI-RS resources being evenly spaced in a frequency domain.

Optionally, in any of the preceding aspects, the first QCL configuration comprises a second set of QCL parameters, the first QCL configuration indicating that the first DMRS has a QCL relationship with a second downlink reference signal with respect to the second set of QCL parameters.

Optionally, in any of the preceding aspects, the second downlink reference signal comprises a second RS for tracking.

Optionally, in any of the preceding aspects, the second downlink reference signal comprises a synchronization signal (SS) or a physical broadcast channel (PBCH) block.

Optionally, in any of the preceding aspects, the first CSI-RS configuration further specifies a time interval at which the first RS is transmitted periodically.

Optionally, in any of the preceding aspects, the first CSI-RS configuration further specifies a length of the first RS in a time domain.

Optionally, in any of the preceding aspects, the first set of QCL parameters comprises an average delay, a Doppler shift, a delay spread, or a spatial receiver parameter.

Optionally, in any of the preceding aspects, the method further includes: signaling, by the network controller, the first CSI-RS configuration.

Optionally, in any of the preceding aspects, the method further includes: transmitting, by the network controller, a second RS for tracking according to a second CSI-RS configuration, the second CSI-RS configuration being different than the first CSI-RS configuration, and the second CSI-RS configuration specifying: a second set of CSI-RS resources in two consecutive slots for transmitting the second RS, the second set of CSI-RS resources comprising a plurality of one-port CSI-RS resources configured according to the second CSI-RS configuration; and a second QCL configuration comprising a third set of QCL parameters, the second QCL configuration indicating that the second RS has a QCL relationship with a second DMRS with respect to the third set of QCL parameters.

Optionally, in any of the preceding aspects, the first RS and the second RS are transmitted to a same user equipment (UE).

Optionally, in any of the preceding aspects, the first RS and the second RS are transmitted at different intervals.

Optionally, in any of the preceding aspects, the second RS comprises a SS block, or a CSI-RS.

Optionally, in any of the preceding aspects, the first RS is transmitted using a full band, a partial band, or a UE-scheduled data transmission bandwidth.

According to another aspect of the present disclosure, a base station is provided to perform the methods in any of the preceding aspects. In some embodiments, a base station includes: a non-transitory memory storage comprising instructions; and one or more processors in communication with the memory storage, wherein the one or more processors execute the instructions to: cause to transmit a first reference signal (RS) for tracking according to a first channel state information-RS (CSI-RS) configuration, the first CSI-RS configuration specifying: a first set of CSI-RS resources in two consecutive slots for transmitting the first RS, the first set of CSI-RS resources comprising a plurality of one-port CSI-RS resources configured according to the first CSI-RS configuration; and a first quasi co-location (QCL) configuration comprising a first set of QCL parameters, the first QCL configuration indicating that the first RS has a QCL relationship with a first demodulation reference signal (DMRS) with respect to the first set of QCL parameters.

According to another aspect of the present disclosure, there is provided a method that includes: receiving, by a user equipment (UE), a first reference signal (RS) for tracking according to a first channel state information-RS (CSI-RS) configuration, the first CSI-RS configuration specifying: a first set of CSI-RS resources in two consecutive slots, the first set of CSI-RS resources comprising a plurality of one-port CSI-RS resources configured according to the first CSI-RS configuration; and a first quasi co-location (QCL) configuration comprising a first set of QCL parameters, the first QCL configuration indicating that the first RS has a QCL relationship with a first demodulation reference signal (DMRS) with respect to the first set of QCL parameters.

Optionally, in any of the preceding aspects, the first set of CSI-RS resources comprises four one-port CSI-RS resources, the four one-port CSI-RS resources being evenly spaced in a frequency domain.

Optionally, in any of the preceding aspects, the first QCL configuration comprises a second set of QCL parameters, the first QCL configuration indicating that the first DMRS has a QCL relationship with a second downlink reference signal with respect to the second set of QCL parameters.

Optionally, in any of the preceding aspects, the second downlink reference signal comprises a second RS for tracking.

Optionally, in any of the preceding aspects, the second downlink reference signal comprises a synchronization signal (SS) or a physical broadcast channel (PBCH) block.

Optionally, in any of the preceding aspects, the first CSI-RS configuration further specifies a time interval at which the first RS is transmitted periodically.

Optionally, in any of the preceding aspects, the first CSI-RS configuration further specifies a length of the first RS in a time domain.

Optionally, in any of the preceding aspects, the first set of QCL parameters comprises an average delay, a Doppler shift, a delay spread, or a spatial receiver parameter.

Optionally, in any of the preceding aspects, the method further includes: receiving, by the UE, the first CSI-RS configuration.

Optionally, in any of the preceding aspects, the method further includes: receiving, by the UE, a second RS for tracking according to a second CSI-RS configuration, the second CSI-RS configuration being different than the first CSI-RS configuration, and the second CSI-RS configuration specifying: a second set of CSI-RS resources in two consecutive slots, the second set of CSI-RS resources comprising a plurality of one-port CSI-RS resources configured according to the second CSI-RS configuration; and a second QCL configuration comprising a third set of QCL parameters, the second QCL configuration indicating that a second DMRS has a QCL relationship with the second RS with respect to the third set of QCL parameters.

Optionally, in any of the preceding aspects, wherein the second RS comprises a SS block, or a CSI-RS.

Optionally, in any of the preceding aspects, the method further includes: receiving, by the UE, a time period after which the first CSI-RS configuration expires.

Optionally, in any of the preceding aspects, the method further includes: demodulating, by the UE, first data received by the UE according to the first QCL configuration.

Optionally, in any of the preceding aspects, the method further includes: performing, by the UE, synchronization estimation based on the first RS and the first QCL configuration.

Optionally, in any of the preceding aspects, the method further includes: performing, by the UE, channel estimation according to the first QCL configuration.

According to another aspect of the present disclosure, a user equipment (UE) is provided to perform the methods in any of the preceding aspects. In some embodiments, a UE includes a non-transitory memory storage comprising instructions; and one or more processors in communication with the memory storage, wherein the one or more processors execute the instructions to: cause to receive a first reference signal (RS) for tracking according to a first channel state information-RS (CSI-RS) configuration, the first CSI-RS configuration specifying: a first set of CSI-RS resources in two consecutive slots for carrying RSs, the first set of CSI-RS resources comprising a plurality of one-port CSI-RS resources configured according to the first CSI-RS configuration; and a first quasi co-location (QCL) configuration comprising a first set of QCL parameters, the first QCL configuration indicating that the first RS has a QCL relationship with a first demodulation reference signal (DMRS) with respect to the first set of QCL parameters.

BRIEF DESCRIPTION OF THE DRAWINGS

For a more complete understanding of the present disclosure, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Embodiments of the present disclosure provide methods and apparatuses for configuring and communicating reference signals (RSs) for tracking in a wireless communications system, e.g., in a new radio (NR) communications system. User equipments (UEs) in a wireless communications system may perform tracking functions, such as fine time tracking, fine frequency tracking, delay spread estimation and Doppler spread estimation, based on RSs transmitted by the network for communicating with the network. In some embodiments, RSs for tracking may be transmitted in a plurality of one-port channel state information-RS (CSI-RS) resources configured according to one or more CSI-RS configurations. The one or more CSI-RS configurations may be signaled to UEs for the UEs to receive the RSs for tracking and to perform tracking functions.

In some embodiments, a network controller may transmit a first RS for tracking according to a first CSI-RS configuration. The first CSI-RS configuration may specify a set of CSI-RS resources in two consecutive slots for transmitting RSs for tracking. The set of CSI-RS resources may include a plurality of one-port CSI-RS resources configured according to the first CSI-RS configuration. The first CSI-RS configuration may also specify a quasi co-location (QCL) configuration including a set of QCL parameters. The QCL configuration indicates that the first RS has a QCL relationship with a demodulation reference signal (DMRS) with respect to the set of QCL parameters. The network controller may further transmit a second RS for tracking according to a second CSI-RS configuration that is different than the first CSI-RS configuration. The network controller may signal both the first and the second CSI-RS configurations to a UK The UE may receive the first RS for tracking according to the first CSI-RS configuration and receive the second RS for tracking according to the second CSI-RS configuration.

Figure 1:
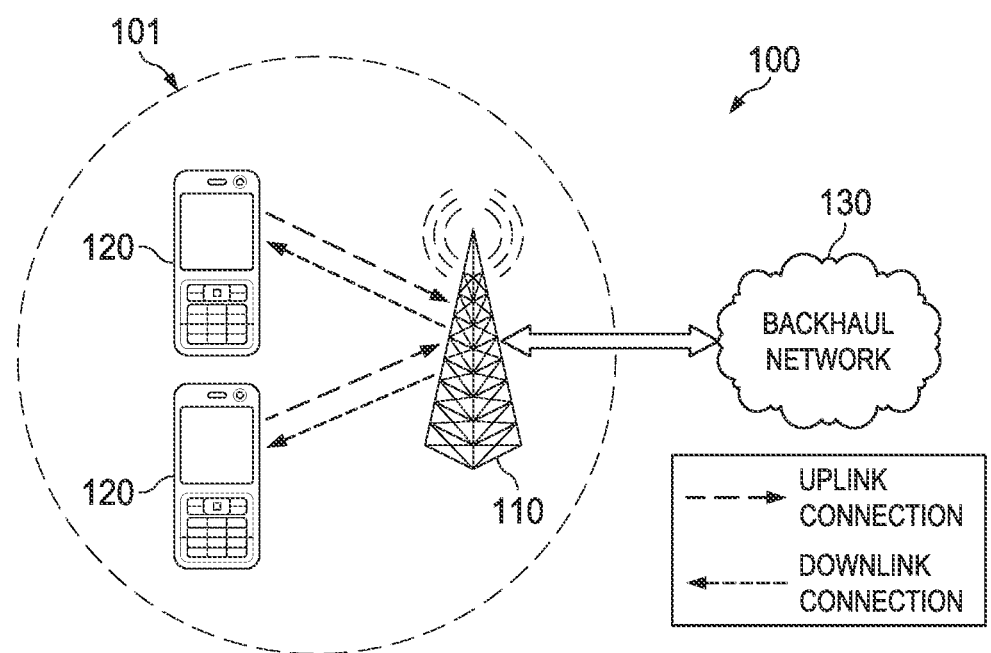
FIG. 1 illustrates a diagram of an embodiment wireless communications network.

FIG. 1 illustrates a network 100 for communicating data. The network 100 comprises a base station 110 having a coverage area 101, a plurality of mobile devices 120, and a backhaul network 130. As shown, the base station 110 establishes uplink (dashed line) and/or downlink (dotted line) connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an enhanced base station (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, low power nodes, etc.

A UE in the network 100 may perform various tracking functionalities, such as fine time tracking, fine frequency tracking, delay spread estimation and Doppler spread estimation. In LTE, cell specific reference signals (CRSs) may always be transmitted in each subframe, providing high density reference signals in both the time and frequency domain. Fine time and frequency synchronization may be performed for signaling and data demodulations based on CRSs received by a receiver. In 5G NR, however, the always-on CRSs are removed. The may be done to eliminate pilot signal pollution, to reduce interference, and to facilitate cell on/off operations. A new UE specific time and frequency tracking reference signal (TRS) has been introduced to replace tracking functionalities performed using CRSs. A TRS may also be referred to as a RS for tracking.

Figure 2:
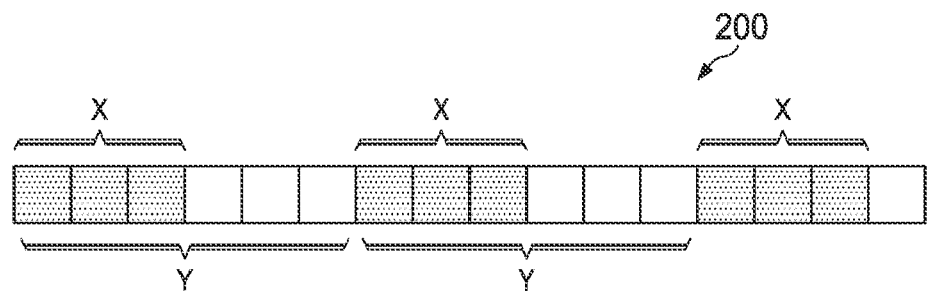
FIG. 2 illustrates a diagram of an embodiment tracking reference signal (TRS) burst structure.

FIG. 2 illustrates a diagram of an embodiment TRS burst structure 200. A TRS burst may refer to TRSs transmitted during a period of time, e.g., in one or more consecutive slots. In one embodiment, the following parameters may be used to describe a TRS burst structure and transmission of TRS bursts.

X: the length of a TRS burst in terms of a number of slots
Y: transmission periodicity of a TRS burst in ms
N: a number of orthogonal frequency division multiplexing (OFDM) symbols within a slot
B: TRS transmission bandwidth in terms of a number of resource blocks (RBs)
$S_f$: TRS subcarrier spacing
$S_t$: TRS symbol spacing within a slot The parameters as described above may be referred to as TRS parameters. Referring to FIG. 2, the TRS burst structure 200 shows that a TRS burst with a length of X (i.e., 3 slots in this example) is transmitted every Y ms. Each square in this example represents one slot. Different tracking target may impose different minimum requirements on time and frequency density of TRSs. For example, TRSs used for time and delay spread tracking require denser pilot (e.g., TRSs) in frequency domain, i.e. smaller subcarrier spacing ($S_f$), and certain wide enough TRS transmission bandwidth (B). While TRSs used for frequency tracking may put less requirements on signal frequency density and transmission bandwidth, it may be desired that a TRS is transmitted on several OFDM symbols with certain large enough time spacing (i.e., $S_t$) for better phase rotation estimation.

Various scenarios may also affect settings of desired TRS parameters. For example, in a case of a high speed train, the Doppler shift experienced by a UE passing its serving base station may suddenly change the sign (i.e., + or −) but remains similar magnitude. An absolute difference of two Doppler shifts before and after the UE passes its serving base station may be very large due to the UE's fast moving speed. To facilitate the UE to correctly estimate the Doppler shift (or Doppler shift state) and to apply corresponding phase compensation, more frequent transmission of TRSs targeting frequency tracking may be desired (i.e., smaller Y and larger N). System overhead may increase with more frequent TRS transmission. Thus, TRS may need to be configured in a UE-specific manner and transmitted with specific frequency resources.

Figure 3:
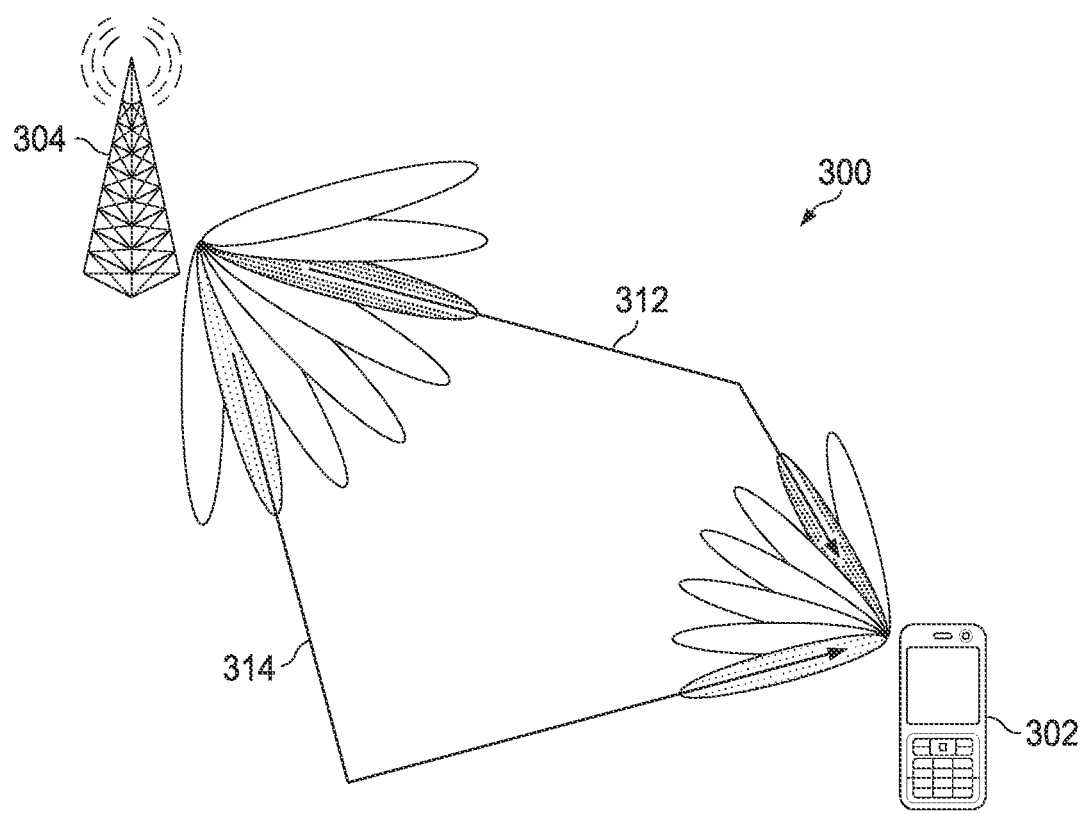
FIG. 3 illustrates a diagram of an embodiment wireless communications network where a UEs communicates with a base station with multiple narrow beams.

3GPP NR also supports wireless communication for high frequency bands, e.g. millimeter-wave spectrum. At higher frequencies, beam-formed transmission may be used to overcome higher path-loss. Beam-forming may be applied not only to UE specific downlink and uplink data transmissions, but also to common channels such as synchronization and control channels. Synchronization and control channels may be transmitted with wider beam for better coverage, and data may be transmitted with narrower beam for desired data throughput. FIG. 3 illustrates a diagram of an embodiment wireless communications network 300, where a UE 302 communicating with a base station 304 with multiple narrow beams. The UE 302 may communicate with the base station 304 in link 312 (i.e., a beam link pair) and link 314 using narrow beams pointing to different directions. Depending on a beam width that a UE uses, the UE may observe different Doppler shifts, delay spreads and Doppler spreads. In some cases, even a UE uses narrow beams of the same beam width, UE tracking parameters may be different when the beams are pointing to different directions.

Quasi-colocation, (or quasi co-location, QCL) assumptions may be made for transmitting reference signals in communications using narrow beams or wide beams. QCL is defined in 3GPP TR 38.802 V2.0.0, section 6.1.6.5, which is incorporated by reference herein in its entirety, where definition of QCL is that "two antenna ports are said to be quasi co-located if properties of the channel over which a symbol on one antenna port is conveyed can be inferred from the channel over which a symbol on the other antenna port is conveyed." QCL as defined supports the following functionalities:

Beam management functionality: at least including spatial parameters
Frequency/timing offset estimation functionality: at least including Doppler/delay parameters
RRM management functionality: at least including average gain A QCL assumption may be referred to as a QCL configuration indicating a QCL relationship between entities, e.g., different reference signals. The terms of "QCL assumption" and "QCL configuration" are used interchangeably throughout the disclosure. For example, a QCL configuration may indicate that a first reference signal has a QCL relationship (or is quasi co-located) with a second reference signal. In this case, one or more parameters that are required by the first reference signal (e.g., used for receiving and decoding the first reference signal) may be obtained (or derived) by use of the second reference signal. Thus, the QCL configuration may also include the one or more parameters. The one or more parameters may be referred to as QCL parameters. In another work, a QCL assumption indicates or specifies a QCL relationship between two reference signals with respect to one or more QCL parameters. A reference signal may include a synchronization signal (SS) or a SS block, a physical broadcast channel block (PBCH), a channel state information-reference signal (CSI-RS), a demodulation reference signal (DMRS), a phase tracking reference signal (PTRS), a TRS, or a sounding reference signal (SRS), or any other reference signals used in wireless communications. QCL assumptions may vary with different beam widths. A QCL assumption between a DMRS and a TRS may be different depending on the conclusion of a QCL assumption between narrow and wide beams. The same QCL assumption or different QCL assumptions may be made between narrow and wide beams. Path delay spread difference and Doppler spread difference between a narrow beam and a wide beam may affect channel estimation performance. QCL assumptions established between reference signals for wide or narrow beam communications are very helpful in channel estimation.

Figure 4:
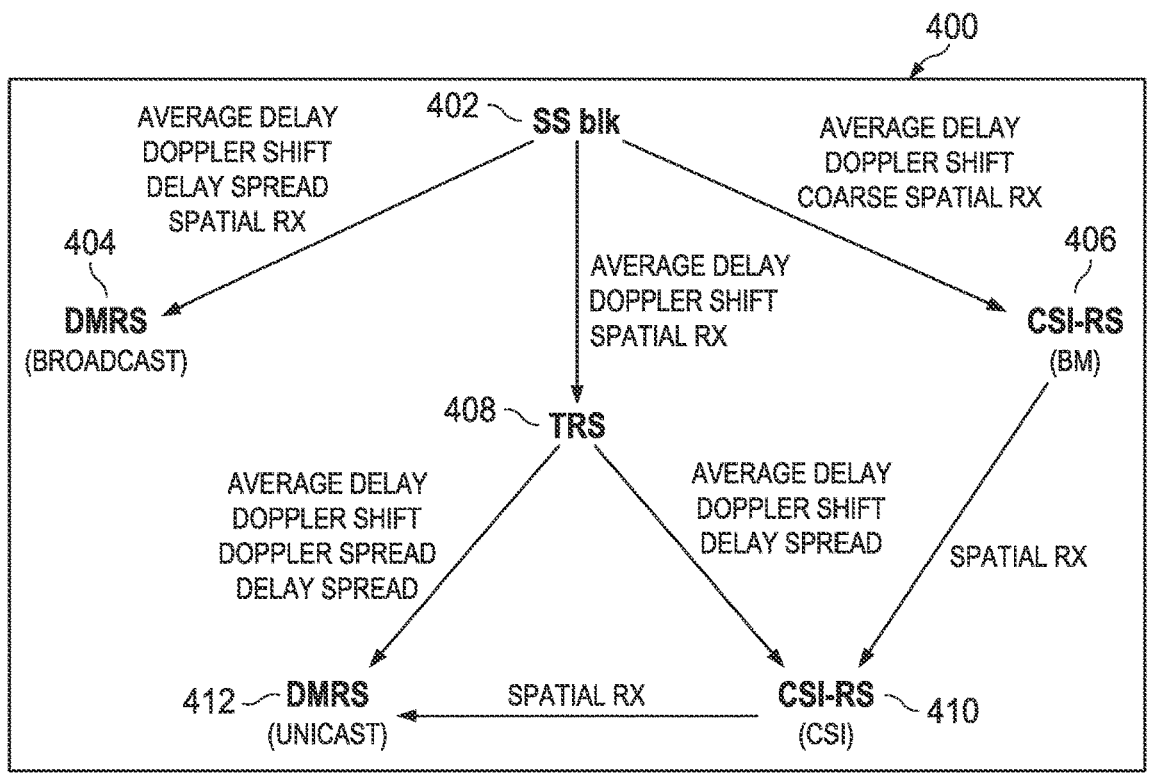
FIG. 4 illustrates a diagram of embodiment quasi-colocation (QCL) relationships between reference signals in a case of a wide TRS beam used for communication.

FIG. 4 is a diagram 400 showing QCL assumptions among NR reference signals when wide beams are used for communications. For example, a TRS, a SS block or a broadcast DMRS may be transmitted using a wide beam. FIG. 4 shows QCL configurations among a SS block 402, a DMRS 404, a CSI-RS 406, a TRS 408, a CSI-RS 410 and a DMRS 412. The DMRS 404 is for a broadcast channel. That is, the DMRS 404 is a DMRS used for demodulation of a system information block (SIB), radio resource control (RRC) signaling, paging, and etc. before a TRS is configured. The CSI-RS 406 is transmitted for beam forming. The CSI-RS 410 is transmitted for channel estimation. The DMRS 412 is used for demodulation of signals transmitted in a unicast channel. An arrow starting from a first reference signal (e.g., the SS block 402) and ending at a second reference signal (e.g., the DMRS 404) indicates that the second reference signal has a QCL relationship with the first reference signal with respect to one or more QCL parameters. The one or more QCL parameters (e.g., an average delay, a Doppler shift, a delay spread, and a spatial RX) are shown on the arrow, indicating that the one or more QCL parameters required by the second reference signal may be derived using the first reference signal.

As shown, the DMRS 404 is configured to have a QCL relationship with the SS block 402. The average delay, Doppler shift, delay spread, and spatial RX for the DMRS 404 may be derived based on the SS block 402. Similarly, the CSI-RS 406 and the TRS 408 has a QCL relationship with the SS block 402, respectively. An average delay, a Doppler shift, and a coarse spatial RX required by the CSI-RS 406 may be derived based on the SS block 402. An average delay, a Doppler shift, and a spatial RX required by the TRS 408 may be derived from the SS block 402. The CSI-RS 410 has a QCL relationship with the CSI-RS 406 and the TRS 408, respectively. The CSI-RS 410 may be received using a spatial RX derived based on the CSI-RS 406, and use an average delay, a Doppler shift, and a delay spread from the TRS 408. The DMRS 412 has a QCL relationship with the TRS 408 and the CSI-RS 410, respectively. The DMRS 412 may be received using a spatial RX derived based on the CSI-RS 410. The DMRS 412 may also be received an average delay, a Doppler shift, a Doppler spread and a delay spread derived based on the TRS 408.

Figure 5:
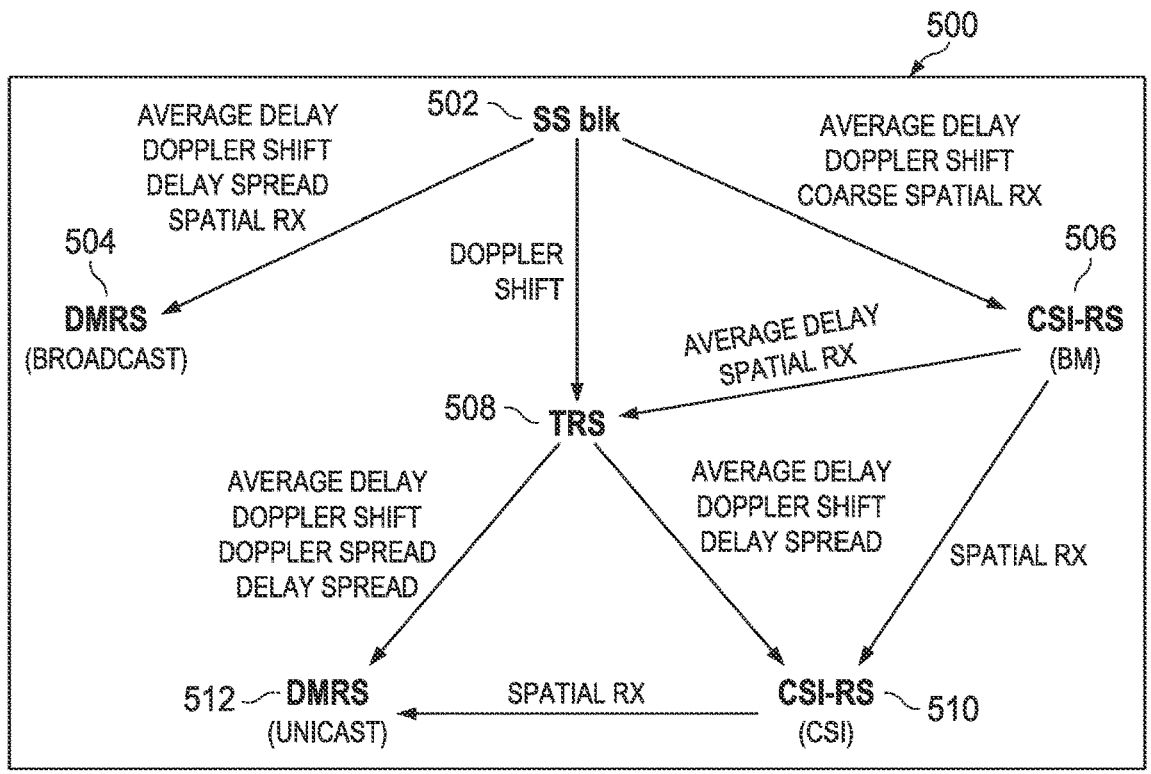
FIG. 5 illustrates a diagram of embodiment QCL relationships between reference signals in a case of a narrow TRS beam used for communication.

FIG. 5 is a diagram 500 showing QCL assumptions among NR reference signals when narrow beams are used for communications. FIG. 5 shows QCL configurations among a SS block 502, a DMRS 504, a CSI-RS 506, a TRS 508, a CSI-RS 510 and a DMRS 512. Similar to FIG. 4, the DMRS 504 is for demodulation of signals in a broadcast channel, e.g., a physical broadcast channel (PBCH), that are transmitted before a TRS is configured. The CSI-RS 506 is transmitted for beam forming. The CSI-RS 510 is transmitted for channel estimation. The DMRS 512 is used for demodulation of signals transmitted in a unicast channel. An arrow starting from a first reference signal and ending at a second reference signal indicates that the second reference signal has a QCL relationship with the first reference signal with respect to one or more QCL parameters. The one or more QCL parameters shown on the arrow indicate that the one or more QCL parameters required by the second reference signal may be derived using the first reference signal. FIG. 5 shows that the reference signals have QCL configurations similar to those illustrated in FIG. 4, except for TRSs. In FIG. 5, the TRS 508 has a QCL relationship with the SS block 502 and the CSI-RS 506, respectively. The TRS 508 may be received using a Doppler shift derived based on the SS block 502, and may be received using an average delay and a spatial RX derived based on the CSI-RS 506. Data transmission may employ multiple narrow beams, and multiple narrow TRS beams may be required for tracking. To support both of the scenarios, configuration of TRSs and their QCL assumptions or association should be flexible. It would be appreciated to have flexible TRS configurations.

Depending on a currently used beam width, and depending on how many narrow beam link pairs that a UE is communicating with, multiple transmissions of TRSs may be needed to support tracking for beamforming. It might not practical to transmit fixed periodic TRSs for each beam width and each narrow beam direction. TRS transmissions and configurations needs to be UE specific and configurable.

Thus, it would be appreciated that TRS transmissions and configurations are UE-specific and configurable. In current 3GPP NR, however, a complete new type signal used as a TRS may need to be defined. Various signal patterns, transmission time offsets and periodicity may need to be designed to cover various tracking targets, deployment scenarios and beamforming. Because TRS transmissions may collide with transmissions of other signals, e.g. SSs, DMRSs, data and etc., rules may also need to be defined for handling collisions and rate matching.

To reduce complexity caused by designing a complete new set of TRSs and associated rules, embodiments of the present disclosure form a TRS by aggregating multiple existing CSI-RSs, e.g., one-port CSI-RSs. In another word, a TRS may be configured according to multiple CSI-RS configurations, e.g., one-port CSI-RS configurations. A one-port CSI-RS refers to a CSI-RS that is transmitted via one antenna port. A TRS configuration may be constructed by aggregating multiple CSI-RS configurations, e.g., one-port CSI-RS configurations. A TRS configuration may also be generally referred to as a CSI-RS configuration in this disclosure, since it include configurations for transmitting CSI-RSs. According to the TRS configuration, a TRS signal may be transmitted via a single antenna port in resources that have been defined according to the multiple one-port CSI-RS configurations for transmitting CSI-RSs. The resulted aggregated TRS (referred to as a new TRS) may be regarded as a new one-port TRS serving one or more specific tracking functionalities. The new TRS may be assumed to have a coarse quasi co-location (QCL) relationship with a NR SS burst with respect to some parameters. For example, the new (one-port) TRS may be assumed to be quasi co-located with the NR-SS burst in term of a frequency offset and a coarse time/Doppler spread. The new TRS may also be assumed to be quasi co-located with certain DMRS ports for UE to perform channel estimation and data demodulation, e.g. in terms of fine time, delay spread and Doppler spread. By use of aggregation of one-port CSI-RS configurations to transmit TRSs, TRS density requirements may be flexibly configured and satisfied. Various CSI-RS design features may also be reused, e.g. flexible periodicity, rate matching, colliding rules and multiple configurations may be reused. What needs to be designed may include aggregation rules, aggregation signaling, and QCL assumptions and TRS configuration signaling. The design and implementation complexities may be greatly reduced.

CSI-RS configurations may specify resources in a period of time, e.g., in two consecutive slots, or per resource block (RB), for transmitting CSI-RSs. A CSI-RS configuration specifying resources for transmitting CSI-RSs via a single antenna port may be referred to as a one-port CSI-RS configuration throughout the disclosure. A RB may include a plurality of resource elements, and each resource element occupies one OFDM symbol in the time domain and one subcarrier in the frequency domain. A RB may consist of 12 consecutive subcarriers for one slot (e.g., 0.5 ms) in the time domain. An example slot may include 14 OFDM symbols. Various configurations of a RB or a slot may be used in the embodiments of the present disclosure.

Figure 6:
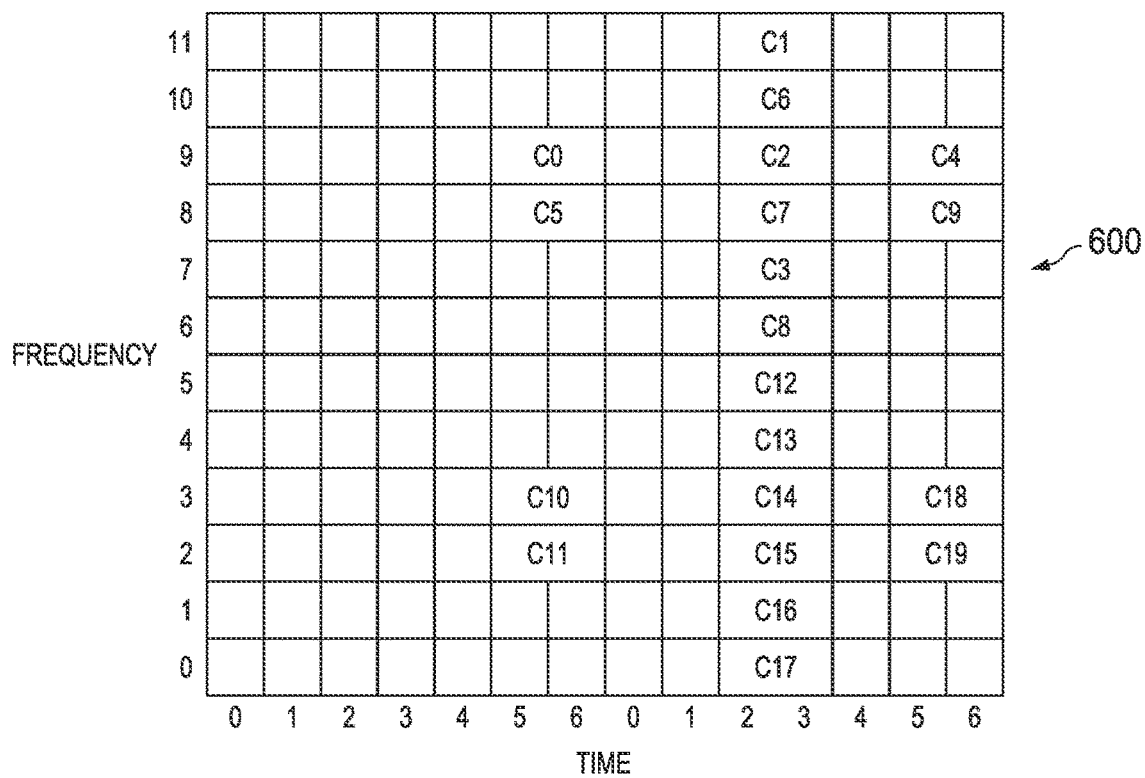
FIG. 6 illustrates a diagram of embodiment one-port CSI-RS configurations.

FIG. 6 illustrates a diagram of an embodiment RB 600. FIG. 6 shows one-port CSI-RS configurations for time domain code division multiplexing (CDM) CSI-RSs. A CDM CSI-RS refers to a CSI-RS for communications using CDM. The RB 600 includes 14 OFDM symbols in the time domain and 12 subcarriers in the frequency domain. Each square represents a resource element. "ci", i=0, 1, . . . 19, represents a one-port CSI-RS configuration i. A resource element marked with ci indicates that the resource element is configured for transmitting CSI-RSs according to a corresponding one-port CSI-RS configuration i. For example, the resource elements (at OFDM symbols 5-6 and subcarrier 9) marked with c0 are configured for transmitting CSI-RSs via one antenna port according to a one-port CSI-RS configuration 0. The resource elements (at OFDM symbols 5-6 and subcarrier 3) marked with c10 are configured for transmitting CSI-RSs via one antenna port according to a one-port CSI-RS configuration 10. The resource elements (at OFDM symbols 2-3 and subcarrier 5) marked with c12 are configured for transmitting CSI-RSs via one antenna port according to a one-port CSI-RS configuration 12. FIG. 6 shows 20 different one-port CSI-RS configurations (i.e., configurations c0-c19). Each one-port CSI-RS configuration specifies two resource elements per RB for transmitting CSI-RSs per antenna port.

Figure 7:
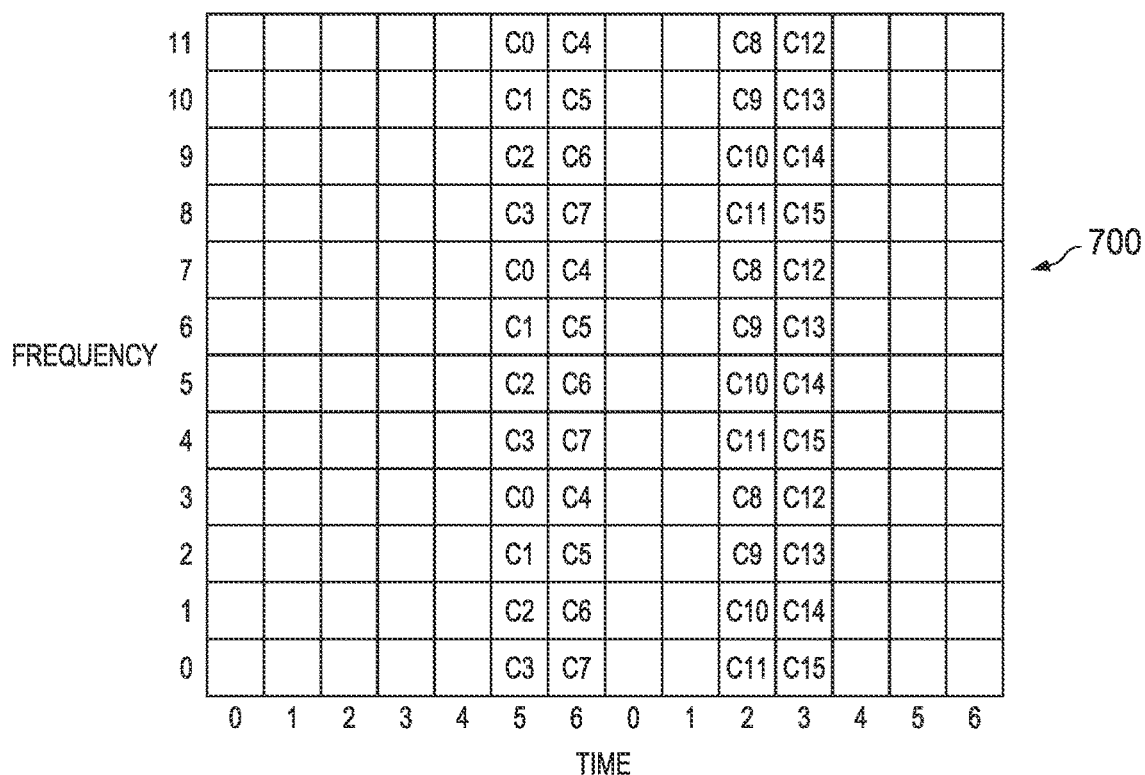
FIG. 7 illustrates a diagram of embodiment one-port CSI-RS configurations.

FIG. 7 illustrates a diagram of another embodiment RB 700. FIG. 7 shows one-port CSI-RS configurations for non-CDM CSI-RSs. A non-CDM CSI-RS refers to a CSI-RS for communications without using CDM. For example, frequency division multiplexing (FDM), or time division multiplexing (TDM), or other multiplexing technique, may be used in the communications. Similar to the RB 600 in FIG. 6, the RB 700 includes 4 OFDM symbols in the time domain and 12 subcarriers in the frequency domain. Each square represents a resource element. "ci", i=0, 1, . . . 15, represents a one-port CSI-RS configuration i. A resource element marked with ci indicates that the resource element is configured for transmitting non-CDM CSI-RSs according to a corresponding one-port CSI-RS configuration i. "non-CDM" is omitted in the following description for convenience only. For example, the resource elements (at OFDM symbol 5 and subcarriers 3, 7, 11) marked with c0 are configured for transmitting CSI-RSs via one antenna port according to a one-port CSI-RS configuration 0. The one-port CSI-RS configuration 0 specifies that the resource elements (at OFDM symbol 5 and subcarriers 3, 7, 11) are configured for transmitting CSI-RSs per antenna port. Similarly, the resource elements (at OFDM symbol 3 and subcarriers 1, 5, 9) marked with c4 are configured for transmitting CSI-RSs via one antenna port according to a one-port CSI-RS configuration 14. The one-port CSI-RS configuration 14 specifies that the resource elements (at OFDM symbol 3 and subcarriers 1, 5, 9) are configured for transmitting CSI-RSs per antenna port. In this example, each one-port CSI-RS configuration specifies 3 resource elements per RB for transmitting CSI-RSs per antenna port.

There are various CSI-RS configurations (e.g., one-port CSI-RS configurations) that have been defined and new CSI-RS configurations that are to be defined. These CSI-RS configurations may be used to construct TRS configurations according to which TRSs are transmitted. In some embodiments, a TRS configuration may be constructed using multiple one-port CSI-RS configurations. The multiple one-port CSI-RS configurations may be for transmission of CDM or non-CDM CSI-RSs. That is, the TRS configuration is constructed by aggregation of the multiple one-port CSI-RS configurations. This means that, according to the constructed TRS configuration, a reference signal for tracking may be transmitted in CSI-RS resources that are configured for CSI-RS transmission according to the multiple one-port CSI-RS configurations. For example, the one-port CSI-RS configurations c0, c2 and c4 illustrated in FIG. 6 may be aggregated to form a TRS configuration. According to this formed TRS configuration, TRSs may be transmitted in resources elements marked by c0, c2 and c4 per RB in FIG. 6. A TRS configuration that is constructed by aggregating multiple one-port CSI-RS configurations may be referred to as a one-port TRS configuration. TRSs configured according to the one-port TRS configuration will be transmitted via one antenna port. Thus, the TRSs may be referred to as one-port TRSs.

In some embodiments, rules may be defined to specify aggregation of different one-port CSI-RS configurations. For example, an aggregation rule may require that resource elements for carrying TRSs per RB have certain distances (e.g., maximum or minimum distances) in the time domain, or in the frequency domain, or both therein. In another example, an aggregation rule may specify whether the resource elements should be evenly spaced in the time domain, or in the frequency domain, or both therein. Based on the aggregation rule, different one-port CSI-RS configurations may be selected and aggregated to form different TRS configurations.

A TRS configuration may indicate one-port CSI-RS configurations that are used to form the TRS configuration. Each of the one-port CSI-RS configurations may be assigned a configuration number, such as c0, c1, . . . , cn, as shown in FIG. 6 or FIG. 7. Each configuration number uniquely identifies a one-port CSI-RS configuration from a plurality of one-port CSI-RS configurations. The TRS configuration may indicate the one-port CSI-RS configurations using their assigned configuration numbers. Because each of the one-port CSI-RS configurations specifies a resource (e.g., one or more resource element per RB) that has been configured for transmitting CSI-RS, by indicating the one-port CSI-RS configurations, the TRS configuration formed by aggregating the one-port CSI-RS configurations consequently specifies a plurality of resources that are specified by the one-port CSI-RS configurations. TRSs may then be transmitted on the plurality of resources according to the TRS configuration.

A TRS configuration may further include a QCL assumption or QCL configuration. The QCL configuration may indicate that a TRS transmitted according to the TRS configuration has a QCL relationship with another reference signal, or with another reference signal at a certain antenna port, in terms of a QCL parameter that is associated with the QCL configuration and the QCL relationship. In one example, the QCL configuration may indicate a reference signal with which the TRS has a QCL relationship, and one or more QCL parameters associated with the QCL configuration and relationship. As shown in FIG. 4 and FIG. 5, a TRS may have a QCL relationship with a SS block or a CSI-RS. In one example, the QCL configuration may indicate that the TRS has a QCL relationship with a SS block of number k in terms of a Doppler shift, and that the TRS has a QCL relationship with a CSI-RS in terms of an average delay. In this case, the QCL configuration may indicate the SS block of number k, with which the TRS has a QCL relationship, and the Doppler shift, which is the QCL parameter associated with the QCL configuration and the QCL relationship. The QCL configuration may also indicate the CSI-RS and the associated QCL parameter, i.e., the average delay. A QCL configuration may further include information about a port, e.g. a DMRS port, or a CSI-RS port, associated with a QCL relationship.

A TRS configuration may also include other parameters that may be used to configure transmission of TRSs, such as bandwidth for transmitting TRSs, periodicity for transmitting TRSs, subcarrier spacing, a length of a TRS (e.g., a TRS burst), or parameters as described with respect to FIG. 2. The bandwidth for transmitting a TRS may include a full band, a partial band, or a UE-scheduled data transmission bandwidth.

A TRS configuration may be signaled to UEs, e.g., in RRC signaling or a broadcast channel. For example, a TRS configuration including a QCL assumption, which further includes the related QCL parameters and associated ports, e.g. a DMRS port, or a CSI-RS port for CSI measurement, may be signaled from a network node to a UE. In the case of multiple TRS configurations configured for a UE, the multiple TRS configurations may be signaled to the UK A UE may receive the signaling of a TRS configuration, obtains a QCL assumption and association between the QCL assumption and a TRS signal, drive one or more QCL parameters from the associated TRS signal, and apply on reception of a corresponding DMRS port or CSI-RS port.

Figure 8:
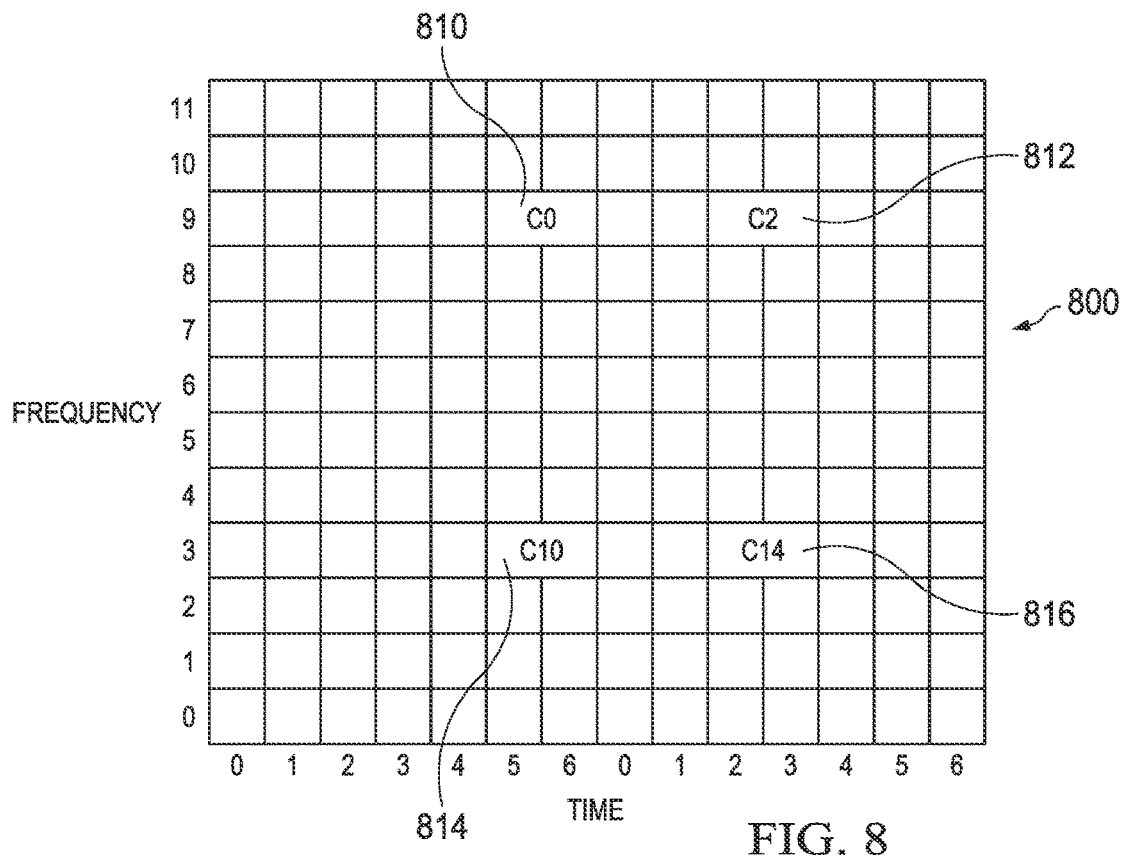
FIG. 8 illustrates a diagram of an embodiment one-port TRS configuration.

FIG. 8 illustrates a diagram of an embodiment RB 800. The RB 800 is similar to the RB 600 in FIG. 6. FIG. 8 shows a TRS configuration formed by aggregating multiple one-port CSI-RS configurations for time domain CDM CSI-RSs. Using LTE one-port time domain CDM CSI-RS patterns as an example, a TRS configuration may be constructed by aggregating 4 one-port CSI-RS configurations shown in FIG. 6. In this example, the TRS configuration is constructed using one-port CSI-RS configurations c0, c2, c10 and c14. TRSs may then be transmitted according to the one-port CSI-RS configurations c0, c2, c10 and c14 in resources specified by these one-port CSI-RS configurations.

A TRS configuration may be formed by aggregating any four one-port time domain CDM CSI-RS configurations, e.g., as shown in FIG. 6, as long as one or more predefined rules are satisfied. Various rules may be defined. In some embodiments, aggregation of 4 one-port CSI-RS configurations for time domain CDM CSI-RSs to construct a TRS configuration may follows the following rules (i.e., Rules 1-8).

Rule 1: TRS signals in one OFDM symbol should be evenly spaced in the frequency domain. For example, resource elements c2, c8, c14 and c17 may be used to transmit reference signals for tracking. They are evenly spaced in the frequency domain.

Rule 2: Adjacent OFDM symbols carrying TRSs should satisfy the following rules:

The minimum distance (represented by $S_{t\_min}$) between two adjacent OFDM symbols satisfies: $S_{t\_min} <= N_{min}$, where $N_{min}$ is a predefined minimal number of OFDM symbols.

The maximum distance (represented by $S_{t\_max}$) between two adjacent OFDM symbols satisfies $N_{max\_l} <= S_{t\_max} <= N_{max\_r}$, where $N_{max\_l}$ and $N_{max\_r}$ are predefined numbers of OFDM symbols.

$N_{min}$, $N_{max\_l}$ and $N_{max\_r}$ depend on tracking target and tracking scenarios.

Rule 3: Subcarriers of resource elements specified by the aggregated one-port CSI-RS configurations are aligned along the frequency domain. That is, resource elements should be aligned in the frequency domain across different one-port CSI-RS configurations. For example, as shown in FIG. 8, resource elements 810 specified by one-port CSI-RS configuration 0 (i.e., configuration c0) are aligned with resource elements 812 specified by one-port CSI-RS configuration 2 (i.e., configuration c2) in the frequency domain (i.e., at the same subcarrier 9). Similarly, resource elements 814 specified by one-port CSI-RS configuration 10 (i.e., configuration c10) are aligned with resource elements 816 specified by one-port CSI-RS configuration 14 (i.e., configuration c14) in the frequency domain (i.e., at the same subcarrier 3).

Rule 4: TRS bandwidth is 25 RBs.

Rule 5: TRS transmission periodicity is 10 ms.

Rule 6: A configured TRS is assumed to be QCL with SS with respect to coarse time/Doppler spread and fine frequency offset. That is, the configured TRS is configured, by default, to have a QCL relationship with a SS block with respect to coarse time/Doppler spread and fine frequency offset.

Rule 7: A configured TRS is assumed to be QCL with certain DMRS ports with respect to fine time/Doppler spread and fine frequency offset. That is, the configured TRS is configured, by default, to have a QCL relationship with the DMRS ports with respect to fine time/Doppler spread and fine frequency offset.

Rule 8: A UE should assume an aggregated TRS signal as a one-port signal, and assist channel estimation and data demodulation only following QCL assumptions signaled to the UE.

One-port non-CDM CSI-RSs may be defined in 3GPP NR, in order to facilitate beam management and time/frequency tracking. In this case, the number of REs per RB (or in two consecutive slots) and per OFDM configured for transmitting CSI-RSs may be equal to or greater than 3. For example, as shown in FIG. 7, one-port CSI-RS configuration 0 specifies 3 resource elements (at OFDM symbol 5 and subcarrier 3, 7 and 11) per RB for transmitting CSI-RSs per antenna port. In some embodiments, a TRS configuration may be constructed by aggregating two one-port non-CDM CSI-RS configurations.

Figure 9:
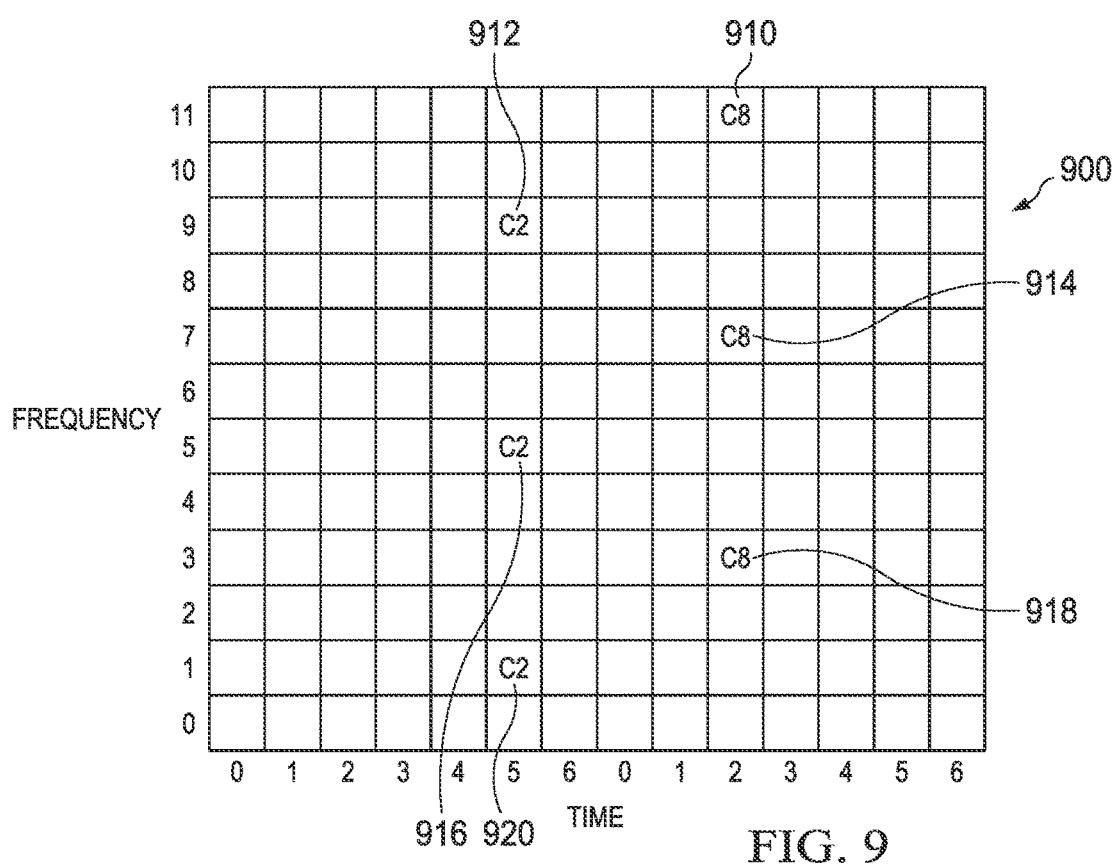
FIG. 9 illustrates a diagram of another embodiment one-port TRS configuration.

FIG. 9 illustrates a diagram of an embodiment RB 900. The RB 900 is similar to the RB 700 in FIG. 7. FIG. 9 shows a TRS configuration formed by aggregating two one-port non-CDM CSI-RS configurations. In this example, the one-port non-CDM CSI-RS configurations c2 and c8, as shown in FIG. 7, are aggregated to form a TRS configuration, and TRSs may be transmitted according to the TRS configuration. That is, TRSs may be carried in the resource elements 912-920 that are specified by the one-port non-CDM CSI-RS configurations c2 and c8.

A TRS configuration may be formed by aggregating any two one-port non-CDM CSI-RS configurations, e.g., as shown in FIG. 7, as long as predefined rules can be satisfied. In some embodiments, aggregation of two one-port non-CDM CSI-RS configurations to construct a TRS configuration may follow the following rules (i.e., Rules 1-8).

Rule 1: TRS signals in one OFDM symbol are evenly spaced in frequency domain. This should be naturally satisfied by the design of one-port, non-CDM CSI-RS configurations. If denser TRSs in frequency are needed, more one-port non-CDM CSI-RS configurations may be aggregated along the frequency domain as long as Rule 1 is satisfied. That is, more than two one-port non-CDM CSI-RS configurations may be aggregated to construct the TRS configuration, provided that Rule 1 is satisfied.

Rule 2: Adjacent OFDM symbols carrying TRSs should satisfy the following rule:

The distance (represented by $S_t$) between two adjacent OFDM symbols satisfies $N_l <= S_t <= N_r$, where $N_l$ and $N_r$ are predefined numbers of OFDM symbols.

Rule 3: Subcarriers of resource elements specified by the aggregated one-port CSI-RS configurations are staggered in the frequency domain to increase frequency resolution. For example, as shown in FIG. 9, resource elements 912-920 specified by the one-port non-CDM CSI-RS configurations c2 and c8 are staggered in the frequency domain (i.e., at subcarriers 9, 7, 5, 3, 1, respectively).

Rule 4: TRS transmission bandwidth is 50 RBs.

Rule 5: TRS transmission periodicity is 160 ms.

Rule 6: A configured TRS is assumed to be QCL with SS with respect to coarse time/delay spread. That is, the configured TRS is configured, by default, to have a QCL relationship with a SS block with respect to coarse time/delay spread.

Rule 7: A configured TRS is assumed to be QCL with certain DMRS ports with respect to fine time/delay spread. That is, the configured TRS is configured, by default, to have a QCL relationship with certain DMRS ports with respect to fine time/delay spread.

Rule 8: A UE should assume an aggregated TRS signal as a one-port signal, and assist channel estimation and data demodulation only following QCL assumptions that are signaled to the UE.

In some embodiments, a UE may receive TRSs configured using multiple sets of aggregated one-port CSI-RS configurations for tracking different parameters. Each of the multiple sets of aggregated one-port CSI-RS configurations may be used to form a one-port TRS configuration, thereby forming multiple TRS configurations. The UE may be configured to receive TRSs configured according to one or more of the multiple TRS configuration.

Figure 10:
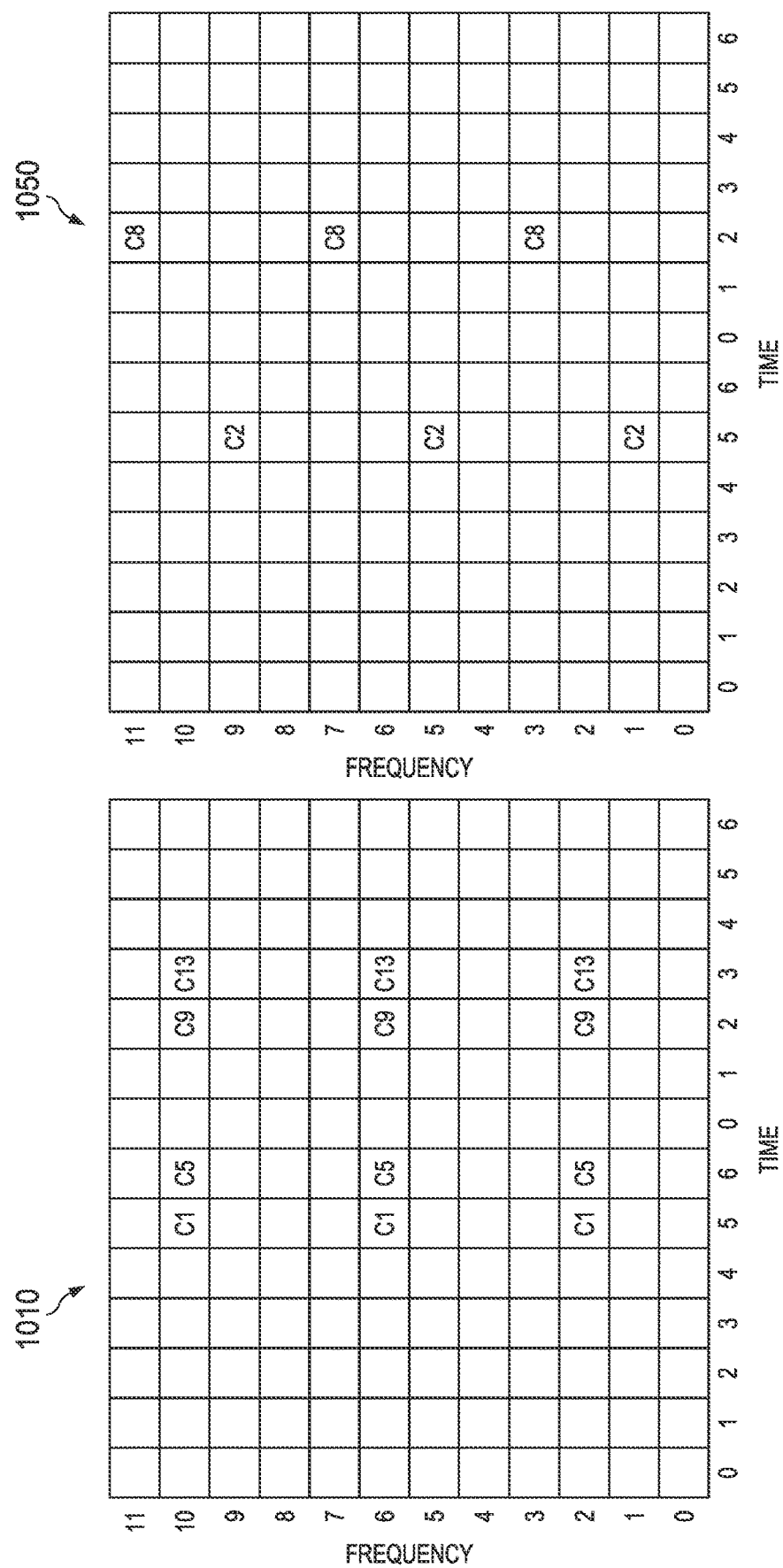
FIG. 10 illustrates a diagram of embodiment one-port TRS configurations.

FIG. 10 illustrates two sets of aggregated one-port CSI-RS configurations that are used to configure TRSs. A UE may be configured with the two sets of aggregated one-port CSI-RS configurations for receiving TRSs. FIG. 10 illustrates a first set of aggregated one-port CSI-RS configuration 1010 and a second set of aggregated one-port CSI-RS configuration 1050. The first set of aggregated one-port CSI-RS configuration 1010 may be used to construct a first TRS configuration, and the second set of aggregated one-port CSI-RS configuration 1050 may be used to construct a second TRS configuration.

As shown in FIG. 10, the first set of aggregated one-port CSI-RS configuration 1010 includes 4 one-port, non-CDM CSI-RS configurations, i.e., c1, c5, c9 and c13. TRSs configured according to the first set of aggregated one-port CSI-RS configurations 1010 (i.e., the first TRS configuration) will be transmitted in resource elements marked with c1, c5, c9 and c13. Transmission periodicity of TRSs configured according to the first TRS configuration may be set to be 20 ms. The first TRS configuration may include a QCL assumption. The QCL assumption may specify that a TRS transmitted according to the first TRS configuration has a QCL relationship with a SS block k with respect to a coarse time/Doppler spread. The QCL assumption may also specify that the TRS signal has a QCL relationship with a DMRS port m with respect to a fine frequency offset, and a time and Doppler spread.

The second set of aggregated one-port CSI-RS configuration 1050 includes two (2) one-port, non-CDM CSI-RS configurations, i.e., c2 and c8. TRSs configured according to the second set of aggregated one-port CSI-RS configurations 1050 (i.e., the second TRS configuration) will be transmitted in resource elements marked with c2 and c8. Transmission periodicity of the TRSs configured according to the second TRS configuration may be set to be 160 ms. The second TRS configuration may include a QCL assumption, which specifies that a TRS transmitted according to the second TRS configuration has a QCL relationship with a SS block k with respect to a delay spread. The QCL assumption may also specify that the TRS has a QCL relationship with a DMRS port m with respect to a fine delay spread.

Figure 11:
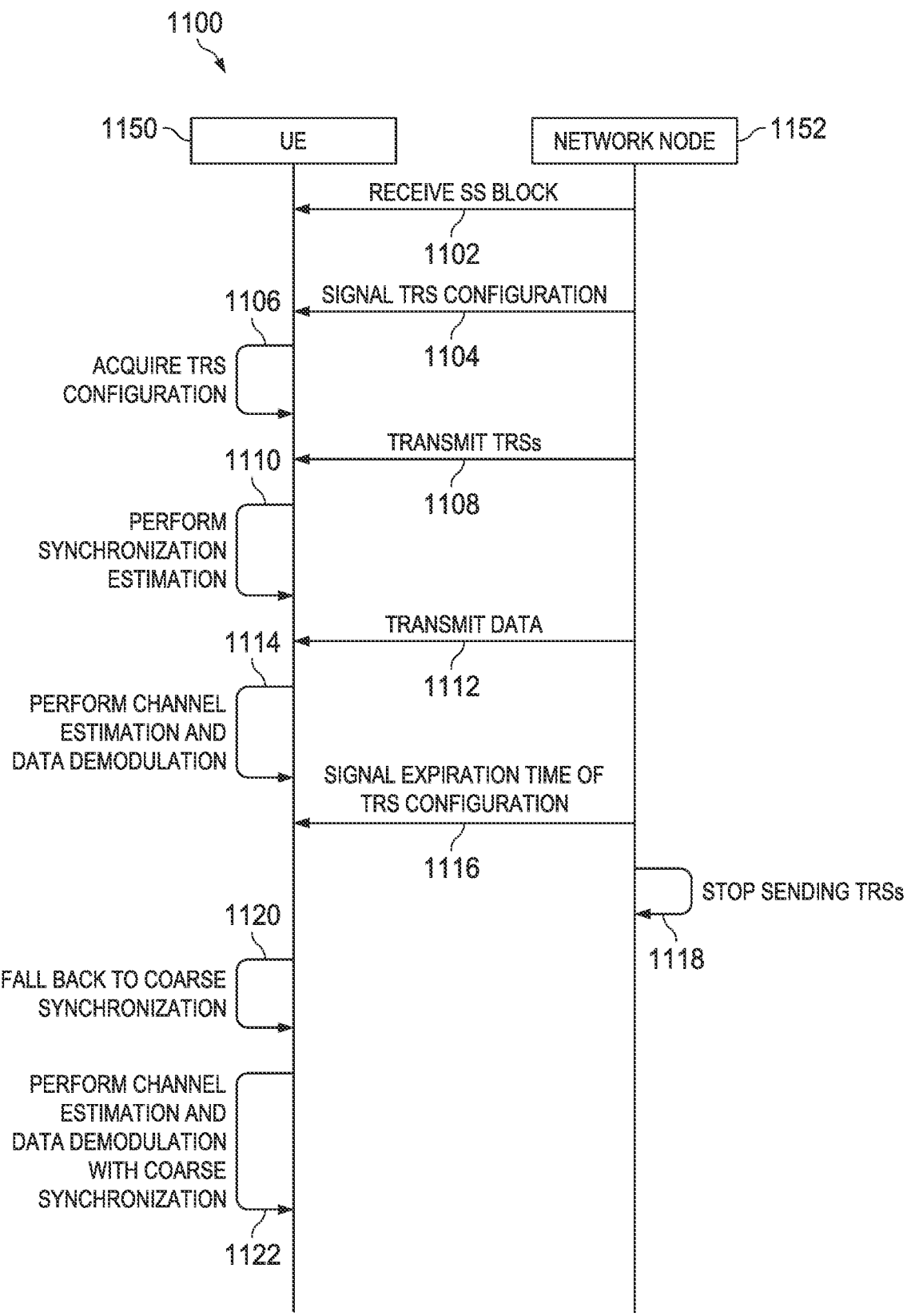
FIG. 11 illustrates a flowchart of an embodiment method for wireless communications.

FIG. 11 illustrates a flowchart of an embodiment method 1100 for wireless communications. In this example, a TRS configuration is constructed through aggregation of one-port CSI-RS configurations. As shown, at step 1102, a UE 1150 receives one or more SS blocks from a network node 1152. The UE may acquire coarse time and frequency synchronizations based on the received one or more SS blocks.

At step 1104, the network node 1152 signals the UE 1150 with one or more TRS configurations, e.g., through RRC signaling or broadcast messages. A TRS configuration may be constructed by aggregating multiple one-port CSI-RS configurations, e.g., as illustrated in FIGS. 8-10. The TRS configuration may include aggregation details, a QCL assumption, and a TRS transmission periodicity. The aggregation details may indicate one-port CSI-RS configurations that are aggregated to construct the TRS configuration. For example, the aggregation details include identifiers (e.g., c0, ci, etc.) identifying the one-port CSI-RS configurations. An identifier may also be a number (e.g., 0, 1, 2, etc.) assigned to a one-port CSI-RS configuration. An identifier identifies a one-port CSI-RS configuration from a plurality of one-port CSI-RS configurations. The aggregation details may also indicate resource elements per RB that are specified by the one-port CSI-RS configurations.

At step 1106, the UE 1150 acquires the one or more TRS configurations. The UE 1150 may receive and decode the broadcast message or RRC signaling by utilizing the coarse time and frequency synchronizations acquired based on the SS blocks, acquire the one or more TRS configurations, and prepare to receive TRSs according to the one or more TRS configurations.

At step 1108, the network node 1152 may transmit, e.g., periodically, TRSs according to one or more TRS configurations. A TRS may be transmitted according to a TRS configuration via a single antenna port. A first TRS transmitted via a first antenna port may have the same TRS configuration as or different TRS configurations than a second TRS transmitted via a second antenna port.

At step 1110, the UE 1150 may perform further synchronization estimation, and other parameter estimations for communications with the network node 1152 using the TRSs periodically transmitted by the network node 1152. For example, the UE 1150 may perform synchronization estimation based on a coarse QCL assumption (e.g., a TRS has a QCL relationship with a SS block) specified in a TRS configuration, and achieve a coarse time and frequency synchronization.

At step 1112, the network node 1152 may transmit data (e.g., a physical downlink shared channel (PDSCH). The data may be demodulated using QCL assumptions specified in one or more TRS configuration. For example, the data may be demodulated by a UE according to a demodulation parameter that is derived based on a TRS that is transmitted according to a TRS configuration.

At step 1114, the UE 1150 may perform channel estimation (for communications between the UE 1150 and the network node 1152) and data demodulation (e.g., for data received by the UE 1150) using the one or more QCL assumptions specified in a TRS configuration.

At step 1116, the network node 1152 may signal, to the UE 1150, expiration time of a TRS configuration that is transmitted by the network node 1152. For example, the network node 1152 may signal, e.g., through RRC signaling, that a current TRS configuration will expire within a certain time period.

At step 1118, the network node 1152 may stop sending TRSs (e.g., periodical TRSs) to the UE 1150.

At step 1120, the UE 1150 may fall back to the coarse synchronization derived from the SS blocks.

At step 1122, the UE 1150 may perform channel estimation and signal demodulation only with the coarse synchronization derived from the SS blocks, in the absence of TRS configuration and transmission.

Figure 12:
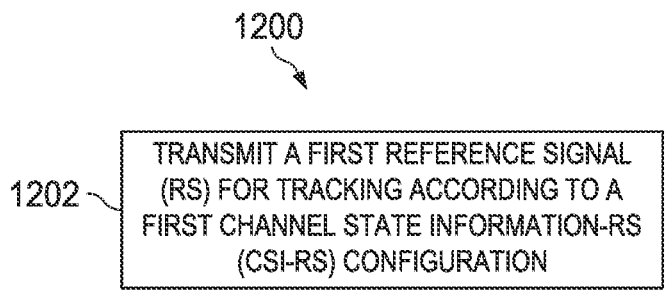
FIG. 12 illustrates a flowchart of another embodiment method for wireless communications.

FIG. 12 illustrates a flowchart of an embodiment method 1200 for wireless communications. The method 1200 may be indicative of operations performed at a network node, such as a network controller, or a base station. As shown, at step 1202, the method 1200 transmits a first reference signal (RS) for tracking according to a first channel state information-RS (CSI-RS) configuration. The first CSI-RS configuration may specify a first set of CSI-RS resources in two consecutive slots for transmitting the first RS. The first set of CSI-RS resources may include a plurality of one-port CSI-RS resources configured according to the first CSI-RS configuration. The first CSI-RS configuration may also specify a first quasi co-location (QCL) configuration including a first set of QCL parameters. The first QCL configuration indicates that the first RS has a QCL relationship with a first demodulation reference signal (DMRS) with respect to the first set of QCL parameters. In some embodiments, the method 1200 may also transmit a second RS for tracking according to a second CSI-RS configuration. The second CSI-RS configuration may be different than the first CSI-RS configuration. The second CSI-RS configuration may specify a second set of CSI-RS resources in two consecutive slots for transmitting the second RS, where the second set of CSI-RS resources includes a plurality of one-port CSI-RS resources configured according to the second CSI-RS configuration. The second CSI-RS configuration may specify a second QCL configuration including a second set of QCL parameters, where the second QCL configuration indicates that the second RS has a QCL relationship with a second DMRS with respect to the second set of QCL parameters.

Figure 13:
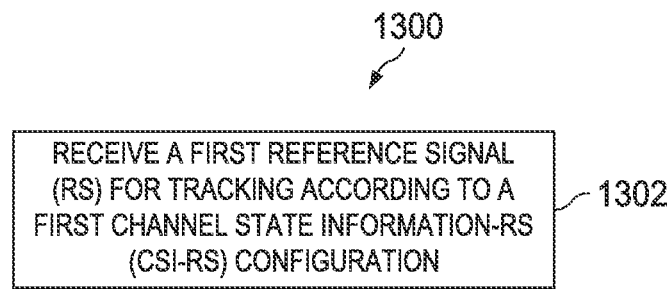
FIG. 13 illustrates a flowchart of yet another embodiment method for wireless communications.

FIG. 13 illustrates a flowchart of an embodiment method 1300 for wireless communications. The method 1300 may be indicative of operations performed at a UE. As shown, at step 1302, the method 1300 receives a first reference signal (RS) for tracking according to a first channel state information-RS (CSI-RS) configuration. The first CSI-RS configuration may specify a first set of CSI-RS resources in two consecutive slots. The first set of CSI-RS resources includes a plurality of one-port CSI-RS resources configured according to the first CSI-RS configuration. The first CSI-RS configuration may also specify a first quasi co-location (QCL) configuration that includes a first set of QCL parameters. The first QCL configuration indicates that the first RS has a QCL relationship with a first demodulation reference signal (DMRS) with respect to the first set of QCL parameters. In some embodiments, the method 1300 may also receive a second RS for tracking according to a second CSI-RS configuration. The second CSI-RS configuration may specify a second set of CSI-RS resources in two consecutive slots, where the second set of CSI-RS resources includes a plurality of one-port CSI-RS resources configured according to the second CSI-RS configuration. The second CSI-RS configuration may also specify a second QCL configuration that includes a second set of QCL parameters. The second QCL configuration indicates that the second RS has a QCL relationship with a second DMRS with respect to the second set of QCL parameters.

Figure 14:
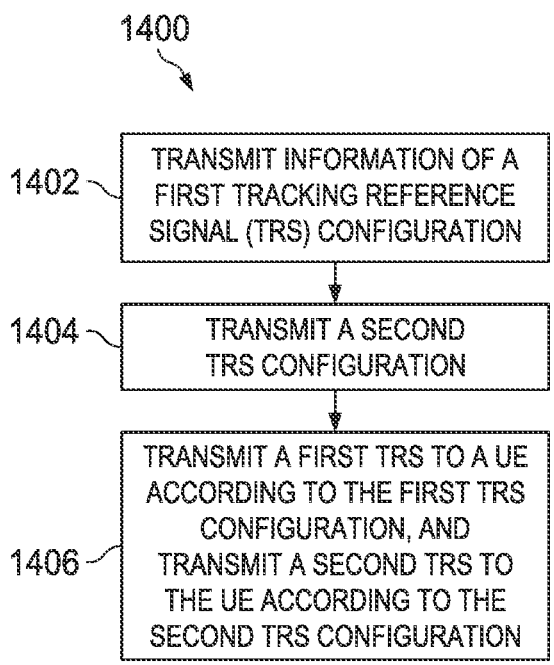
FIG. 14 illustrates a flowchart of yet another embodiment method for wireless communications.

FIG. 14 illustrates a flowchart of an embodiment method 1400 for wireless communications. The method 1400 may be indicative of operations performed at a network node, such as a network controller, or a base station. As shown, at step 1402, the method 1400 transmits a first tracking reference signal CTRS) configuration. The first TRS configuration may specify a first TRS resource in a period of time, e.g., in two consecutive slots, or per physical resource block (PRB), for transmitting a TRS burst. The first TRS resource includes a first plurality of channel state information-reference signal (CSI-RS) resources, and each of the first plurality of CSI-RS resources is configured for transmitting CSI-RSs per antenna port according to a corresponding CSI-RS configuration. The first TRS configuration may specify a first quasi co-location (QCL) configuration that includes a first QCL parameter, where the first QCL configuration indicates that a TRS transmitted according to the first TRS configuration has a QCL relationship with a reference signal with respect to the first QCL parameter. At step 1404, the method 1400 may transmit a second TRS configuration. The second TRS configuration may specify a second TRS resource in a period of time, e.g., in two consecutive slots, or per PRB, for transmitting a TRS burst. The second TRS resource includes a second plurality of CSI-RS resources, and each of the second plurality of CSI-RS resources is configured for transmitting CSI-RSs per antenna port according to a corresponding CSI-RS configuration. The second TRS configuration may specify a second QCL configuration that includes a second QCL parameter, where the second QCL configuration indicates that a TRS transmitted according to the second TRS configuration has a QCL relationship with a reference signal with respect to the second QCL parameter. Steps 1402 and 1404 may be performed at the same time or different time. At step 1406, the method 1400 transmits a first TRS to a UE according to the first TRS configuration, and transmits a second TRS to the UE according to the second TRS configuration.

An embodiment of the present disclosure provides a method that includes receiving, by a user equipment (UE), a one-port tracking reference signal (TRS) comprising an aggregation of a plurality of one-port channel state information-reference signal (CSI-RS) configurations.

Optionally, in any of the preceding aspects, the method further includes: comprising receiving, by the UE, quasi co-location (QCL) assumptions of the TRS.

Optionally, in any of the preceding aspects, the QCL assumptions includes: coarse QCL assumptions with respect to QCL parameters for a synchronization signal to assist with reception of the TRS; and fine QCL assumptions with respect to QCL parameters for associated DMRS port(s) and/or CSI-RS port(s) to assist with pilot channel estimation or/and data demodulation.

Optionally, in any of the preceding aspects, the method further includes: assuming, by the UE, only the QCL assumptions that are signaled with a specific TRS configuration.

Optionally, in any of the preceding aspects, the method further includes: configuring the UE with multiple sets of TRS targeting different QCL parameters or different DMRS port/s and/or CSI-RS port/s.

Optionally, in any of the preceding aspects, a transmission bandwidth of the TRS being one of full band, partial band, or within a UE-scheduled data transmission bandwidth.

An embodiment of the present disclosure also provides a user equipment (UE) that includes: a receiver; a non-transitory memory storage comprising instructions; and one or more processors in communication with the receiver and the memory storage. The one or more processors execute the instructions to receive a one-port tracking reference signal (TRS) comprising an aggregation of a plurality of one-port channel state information-reference signal (CSI-RS) configurations.

Optionally, in any of the preceding aspects, the one or more processors execute the instructions to receive quasi co-location (QCL) assumptions of the TRS.

Optionally, in any of the preceding aspects, the QCL assumptions includes: coarse QCL assumptions with respect to QCL parameters for a synchronization signal to assist with reception of the TRS; and fine QCL assumptions with respect to QCL parameters for associated DMRS port(s) and/or CSI-RS port(s) to assist with pilot channel estimation or/and data demodulation.

Optionally, in any of the preceding aspects, the one or more processors execute the instructions to assume only the QCL assumptions that are signaled with a specific TRS configuration.

Optionally, in any of the preceding aspects, the one or more processors execute the instructions to configure the UE with multiple sets of TRS targeting different QCL parameters or different DMRS port(s) and/or CSI-RS port(s).

Optionally, in any of the preceding aspects, a transmission bandwidth of the TRS is one of full band, partial band, or within a UE-scheduled data transmission bandwidth.

Figure 15:
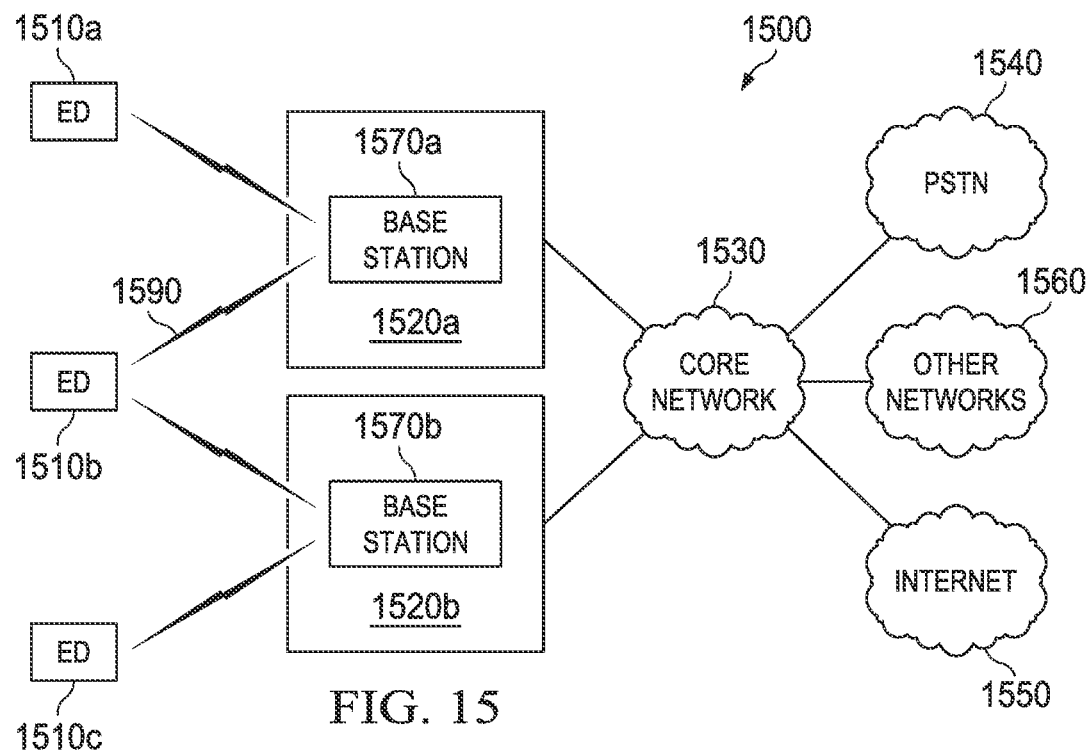
FIG. 15 illustrates a diagram of an embodiment communications system.

FIG. 15 illustrates a diagram of an embodiment communications system 1500. In general, the system 1500 enables multiple wireless or wired users to transmit and receive data and other content. The system 1500 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA), etc.

In this example, the communication system 1500 includes electronic devices (ED) 1510a-1510c, radio access networks (RANs) 1520a-1520b, a core network 1530, a public switched telephone network (PSTN) 1540, the Internet 1550, and other networks 1560. While certain numbers of these components or elements are shown in FIG. 15, any number of these components or elements may be included in the system 1500.

The EDs 1510a-1510c are configured to operate and/or communicate in the system 1500. For example, the EDs 1510a-1510c are configured to transmit and/or receive via wireless or wired communication channels. Each ED 1510a-1510c represents any suitable end user device and may include such devices (or may be referred to) as a user equipment/device (UE), wireless transmit/receive unit (WTRU), mobile station, fixed or mobile subscriber unit, cellular telephone, personal digital assistant (PDA), smartphone, laptop, computer, touchpad, wireless sensor, or consumer electronics device.

The RANs 1520a-1520b here include base stations 1570a-1570b, respectively. Each base station 1570a-1570b is configured to wirelessly interface with one or more of the EDs 1510a-1510c to enable access to the core network 1530, the PSTN 1540, the Internet 1550, and/or the other networks 1560. For example, the base stations 1570a-1570b may include (or be) one or more of several well-known devices, such as a base transceiver station (BTS), a transmit-receive point (TRP), a gNB consisting of a CU and one or multiple DUs/TRPs, a Node-B (NodeB), an evolved NodeB (eNodeB), a Home NodeB, a Home eNodeB, a site controller, an access point (AP), or a wireless router. The RANs 1520a-1520b here may alternatively comprise logical base stations that include one or more CUs, one or more DUs, and one or more TRPs. The RANs 1520a-1520b here may alternatively comprise single dual carrier base stations with main channel and secondary channel connectivity. The EDs 1510a-1510c are configured to interface and communicate with the Internet 1550 and may access the core network 1530, the PSTN 1540, and/or the other networks 1560.

In the embodiment shown in FIG. 15, the base station 1570a forms part of the RAN 1520a, which may include other base stations, elements, and/or devices. Also, the base station 1570b forms part of the RAN 1520b, which may include other base stations, elements, and/or devices. Each base station 1570a-1570b operates to transmit and/or receive wireless signals within a particular geographic region or area, sometimes referred to as a "cell." In some embodiments, multiple-input multiple-output (MIMO) technology may be employed having multiple transceivers for each cell.

The base stations 1570a-1570b communicate with one or more of the EDs 1510a-1510c over one or more air interfaces 1590 using wireless communication links. The air interfaces 1590 may utilize any suitable radio access technology.

It is contemplated that the system 1500 may use multiple channel access functionality, including such schemes as described above. In particular embodiments, the base stations and EDs implement 5G NR, LTE, LTE-A, and/or LTE-B. Of course, other multiple access schemes and wireless protocols may be utilized.

The RANs 1520a-1520b are in communication with the core network 1530 to provide the EDs 1510a-1510c with voice, data, application, Voice over Internet Protocol (VoIP), or other services. Understandably, the RANs 1520a-1520b and/or the core network 1530 may be in direct or indirect communication with one or more other RANs (not shown). The core network 1530 may also serve as a gateway access for other networks (such as the PSTN 1540, the Internet 1550, and the other networks 1560). In addition, some or all of the EDs 1510a-1510c may include functionality for communicating with different wireless networks over different wireless links using different wireless technologies and/or protocols. Instead of wireless communication (or in addition thereto), the EDs may communicate via wired communication channels to a service provider or switch (not shown), and to the Internet 1550.

Although FIG. 15 illustrates one example of a communication system, various changes may be made to FIG. 15. For example, the communication system 1500 could include any number of EDs, base stations, networks, or other components in any suitable configuration.

Figure 16A:
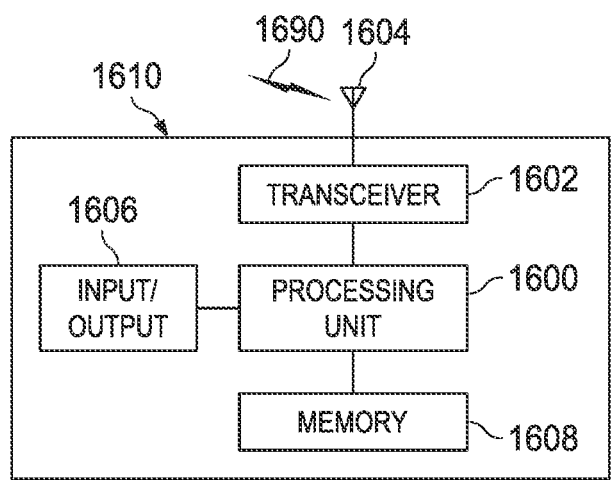
FIG. 16A illustrates a diagram of an embodiment electronic device.
Figure 16B:
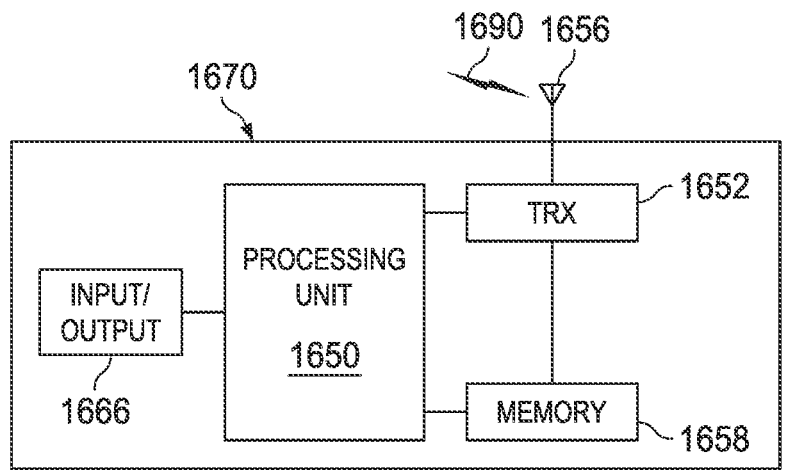
FIG. 16B illustrates a diagram of an embodiment base station.

FIGS. 16A and 16B illustrate example devices that may implement the methods and teachings according to this disclosure. In particular, FIG. 16A illustrates an example ED 1610, and FIG. 16B illustrates an example base station 1670. These components could be used in the system 1500 or in any other suitable system.

As shown in FIG. 16A, the ED 1610 includes at least one processing unit 1600. The processing unit 1600 implements various processing operations of the ED 1610. For example, the processing unit 1600 could perform signal coding, data processing, power control, input/output processing, or any other functionality enabling the ED 1610 to operate in the system 1500. The processing unit 1600 also supports the methods and teachings described in more detail above. Each processing unit 1600 includes any suitable processing or computing device configured to perform one or more operations. Each processing unit 1600 could, for example, include a microprocessor, microcontroller, digital signal processor, field programmable gate array, or application specific integrated circuit.

The ED 1610 also includes at least one transceiver 1602. The transceiver 1602 is configured to modulate data or other content for transmission by at least one antenna or NIC (Network Interface Controller) 1604, but typically more than one antenna for beamforming purposes. The transceiver 1602 is also configured to demodulate data or other content received by the at least one antenna 1604. Each transceiver 1602 includes any suitable structure for generating signals for wireless or wired transmission and/or processing signals received wirelessly or by wire. Each antenna 1604 includes any suitable structure for transmitting and/or receiving wireless or wired signals. One or multiple transceivers 1602 could be used in the ED 1610, and one or multiple antennas 1604 could be used in the ED 1610. Although shown as a single functional unit, a transceiver 1602 could also be implemented using at least one transmitter and at least one separate receiver.

The ED 1610 further includes one or more input/output devices 1606 or interfaces (such as a wired interface to the Internet 1550). The input/output devices 1606 facilitate interaction with a user or other devices (network communications) in the network. Each input/output device 1606 includes any suitable structure for providing information to or receiving/providing information from a user, such as a speaker, microphone, keypad, keyboard, display, or touch screen, including network interface communications.

In addition, the ED 1610 includes at least one memory 1608. The memory 1608 stores instructions and data used, generated, or collected by the ED 1610. For example, the memory 1608 could store software or firmware instructions executed by the processing unit(s) 1600 and data used to reduce or eliminate interference in incoming signals. Each memory 1608 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 16B, the base station (or CU/DU/TRP with RRH) 1670 includes at least one processing unit 1650, at least one transceiver 1652, which includes functionality for a transmitter and a receiver, one or more antennas 1656, at least one memory 1658, and one or more input/output devices or interfaces 1666. A scheduler, which would be understood by one skilled in the art, is coupled to the processing unit 1650. The scheduler could be included within or operated separately from the base station 1670. The processing unit 1650 implements various processing operations of the base station 1670, such as signal coding, data processing, power control, input/output processing, or any other functionality. The processing unit 1650 can also support the methods and teachings described in more detail above. Each processing unit 1650 includes any suitable processing or computing device configured to perform one or more operations. Each processing unit 1650 could, for example, include a microprocessor, microcontroller, digital signal processor, field programmable gate array, or application specific integrated circuit.

Each transceiver 1652 includes any suitable structure for generating signals for wireless or wired transmission to one or more EDs or other devices. Each transceiver 1652 further includes any suitable structure for processing signals received wirelessly or by wire from one or more EDs or other devices. Although shown combined as a transceiver 1652, a transmitter and a receiver could be separate components. Each antenna 1656 includes any suitable structure for transmitting and/or receiving wireless or wired signals. While a common antenna 1656 is shown here as being coupled to the transceiver 1652, one or more antennas 1656 could be coupled to the transceiver(s) 1652, allowing separate antennas 1656 to be coupled to the transmitter and the receiver if equipped as separate components. Each memory 1658 includes any suitable volatile and/or non-volatile storage and retrieval device(s). Each input/output device 1666 facilitates interaction with a user or other devices (network communications) in the network. Each input/output device 1666 includes any suitable structure for providing information to or receiving/providing information from a user, including network interface communications.

Figure 17:
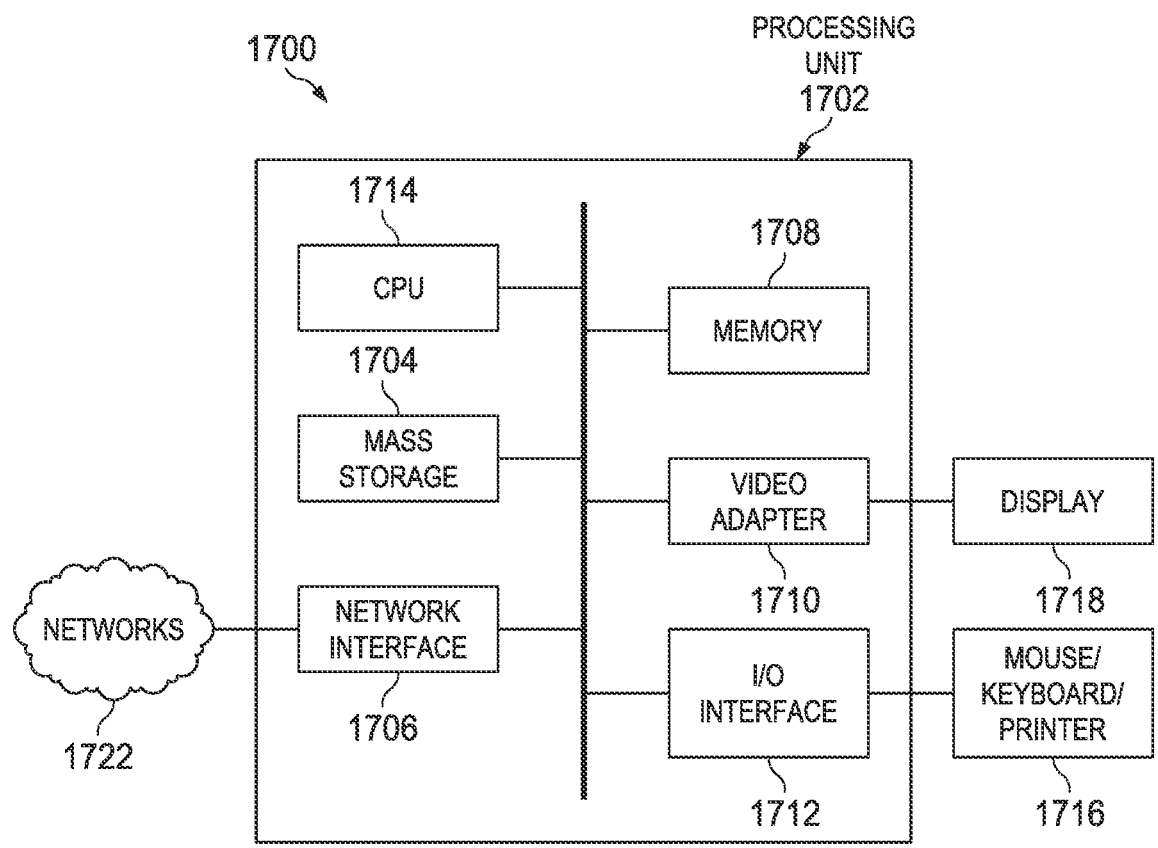
FIG. 17 illustrates a block diagram of an embodiment computing system.

FIG. 17 is a block diagram of a computing system 1700 that may be used for implementing the devices and methods disclosed herein. For example, the computing system can be any entity of UE, access network (AN), mobility management (MM), session management (SM), user plane gateway (UPGW), and/or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1700 includes a processing unit 1702. The processing unit includes a central processing unit (CPU) 1714, memory 1708, and may further include a mass storage device 1704, a video adapter 1710, and an I/O interface 1712 connected to a bus 1720.

The bus 1720 may be one or more of any type of several bus architectures including a memory bus or memory controller, a peripheral bus, or a video bus. The CPU 1714 may comprise any type of electronic data processor. The memory 1708 may comprise any type of non-transitory system memory such as static random access memory (SRAM), dynamic random access memory (DRAM), synchronous DRAM (SDRAM), read-only memory (ROM), or a combination thereof. In an embodiment, the memory 1708 may include ROM for use at boot-up, and DRAM for program and data storage for use while executing programs.

The mass storage 1704 may comprise any type of non-transitory storage device configured to store data, programs, and other information and to make the data, programs, and other information accessible via the bus 1720. The mass storage 1704 may comprise, for example, one or more of a solid state drive, hard disk drive, a magnetic disk drive, or an optical disk drive.

The video adapter 1710 and the I/O interface 1712 provide interfaces to couple external input and output devices to the processing unit 1702. As illustrated, examples of input and output devices include a display 1718 coupled to the video adapter 1710 and a mouse/keyboard/printer 1716 coupled to the I/O interface 1712. Other devices may be coupled to the processing unit 1702, and additional or fewer interface cards may be utilized. For example, a serial interface such as Universal Serial Bus (USB) (not shown) may be used to provide an interface for an external device.

The processing unit 1702 also includes one or more network interfaces 1706, which may comprise wired links, such as an Ethernet cable, and/or wireless links to access nodes or different networks. The network interfaces 1706 allow the processing unit 1702 to communicate with remote units via the networks. For example, the network interfaces 1706 may provide wireless communication via one or more transmitters/transmit antennas and one or more receivers/receive antennas. In an embodiment, the processing unit 1702 is coupled to a local-area network 1722 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a configuration unit/module, an aggregation unit/module, a signaling unit/module, a specification unit/module, a demodulation unit/module, a tracking unit/module, a synchronization unit/module, a channel estimation unit/module, and/or an assumption unit/module. The respective units/modules may be hardware, software, or a combination thereof. For instance, one or more of the units/modules may be an integrated circuit, such as field programmable gate arrays (FPGAs) or application-specific integrated circuits (ASICs).

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

The invention claimed is:

1. A method, comprising:
transmitting, by a network controller, a first quasi co-location (QCL) configuration of a first reference signal (RS), the first QCL configuration indicating:
a first QCL relationship between a second RS and the first RS with respect to a first set of QCL parameters, and
a second QCL relationship between a third RS and the first RS with respect to a second set of QCL parameters; and
transmitting, by the network controller, the first RS, the second RS, and the third RS in accordance with the first QCL configuration.

2. The method of claim 1, the first set of QCL parameters comprising a Doppler shift, a Doppler spread, an average delay, and a delay spread.

3. The method of claim 1, the second set of QCL parameters comprising a spatial receiver parameter.

4. The method of claim 1, the first RS being a demodulation RS (DMRS), the second RS being a tracking RS (TRS), the third RS being a channel state information RS (CSI-RS) for beam management or the third RS is a synchronization signal (SS) block.

5. The method of claim 1, the transmitting the first QCL configuration comprising:
transmitting, by the network controller, the first QCL configuration in a radio resource control (RRC) signal or a broadcast signal.

6. The method of claim 1, wherein the first set of QCL parameters is derived using the second RS, or wherein the second set of QCL parameters is derived using the third RS.

7. A method, comprising:
receiving, by a user equipment (UE), a first quasi co-location (QCL) configuration of a first reference signal (RS), the first QCL configuration indicating:
a first QCL relationship between a second RS and the first RS with respect to a first set of QCL parameters, and
a second QCL relationship between a third RS and the first RS with respect to a second set of QCL parameters;
receiving, by the UE, the second RS;
receiving, by the UE, the third RS; and
receiving, by the UE, the first RS based on the first QCL relationship and the second QCL relationship.

8. The method of claim 7, the first set of QCL parameters comprising a Doppler shift, a Doppler spread, an average delay, and a delay spread.

9. The method of claim 7, the second set of QCL parameters comprising a spatial receiver parameter.

10. The method of claim 7, the first RS being a demodulation RS (DMRS), the second RS being a tracking RS (TRS), the third RS being a channel state information RS (CSI-RS) for beam management or the third RS is a synchronization signal (SS) block.

11. The method of claim 7, the receiving the first QCL configuration comprising:
receiving, by the UE, the first QCL configuration in a radio resource control (RRC) signal or a broadcast signal.

12. The method of claim 7, wherein the first set of QCL parameters is derived using the second RS, or wherein the second set of QCL parameters is derived using the third RS.

13. A network controller, comprising:
at least one processor; and
a non-transitory computer readable storage medium storing instructions that, when executed by the at least one processor, cause the network controller to perform operations including:
transmitting a first quasi co-location (QCL) configuration of a first reference signal (RS), the first QCL configuration indicating:
a first QCL relationship between a second RS and the first RS with respect to a first set of QCL parameters, and
a second QCL relationship between a third RS and the first RS with respect to a second set of QCL parameters; and
transmitting the first RS, the second RS, and the third RS in accordance with the first QCL configuration.

14. The network controller of claim 13, the first set of QCL parameters comprising a Doppler shift, a Doppler spread, an average delay, and a delay spread.

15. The network controller of claim 13, the second set of QCL parameters comprising a spatial receiver parameter.

16. The network controller of claim 13, the first RS being a demodulation RS (DMRS), the second RS being a tracking RS (TRS), the third RS being a channel state information RS (CSI-RS) for beam management or the third RS is a synchronization signal (SS) block.

17. The network controller of claim 13, the transmitting the first QCL configuration comprising:
transmitting, by the network controller, the first QCL configuration in a radio resource control (RRC) signal or a broadcast signal.

18. The network controller of claim 13, wherein the first set of QCL parameters is derived using the second RS, or wherein the second set of QCL parameters is derived using the third RS.

19. A user equipment (UE), comprising:
at least one processor; and
a non-transitory computer readable storage medium storing instructions that, when executed by the at least one processor, cause the UE to perform operations including:
receiving a first quasi co-location (QCL) configuration of a first reference signal (RS), the first QCL configuration indicating:
a first QCL relationship between a second RS and the first RS with respect to a first set of QCL parameters, and
a second QCL relationship between a third RS and the first RS with respect to a second set of QCL parameters;
receiving the second RS;

receiving the third RS; and receiving the first RS based on the first QCL relationship and the second QCL relationship.

20. The UE of claim 19, the first set of QCL parameters comprising a Doppler shift, a Doppler spread, an average delay, and a delay spread.

21. The UE of claim 19, the second set of QCL parameters comprising a spatial receiver parameter.

22. The UE of claim 19, the first RS being a demodulation RS (DMRS), the second RS being a tracking RS (TRS), the third RS being a channel state information RS (CSI-RS) for beam management or the third RS is a synchronization signal (SS) block.

23. The UE of claim 19, the receiving the first QCL configuration comprising:

receiving the first QCL configuration in a radio resource control (RRC) signal or a broadcast signal.

24. The UE of claim 19, wherein the first set of QCL parameters is derived using the second RS, or wherein the second set of QCL parameters is derived using the third RS.

* * * * *

UNITED STATES PATENT AND TRADEMARK OFFICE
CERTIFICATE OF CORRECTION

PATENT NO. : 12,284,125 B2
APPLICATION NO. : 18/330813
DATED : April 22, 2025
INVENTOR(S) : Cheng et al.

Page 1 of 1

It is certified that error appears in the above-identified patent and that said Letters Patent is hereby corrected as shown below:

In the Specification

In Column 6, Line 24, delete "UK" and insert -- UE. --.

In Column 11, Line 22, delete "4" and insert -- 14 --.

In Column 11, Line 38, delete "c4" and insert -- c14 --.

In Column 13, Line 6, delete "UK" and insert -- UE. --.

In Column 14, Line 55, delete "$N_1$ and N," and insert -- $N_l$ and $N_r$ --.

In Column 16, Line 13, delete "ci," and insert -- c1, --.

In Column 17, Line 65, delete "CTRS)" and insert -- (TRS) --.

Signed and Sealed this
Twenty-seventh Day of May, 2025

Coke Morgan Stewart
*Acting Director of the United States Patent and Trademark Office*